(12) United States Patent
Inoue

(10) Patent No.: US 7,131,732 B2
(45) Date of Patent: Nov. 7, 2006

(54) PROJECTOR APPARATUS, INCLINATION ANGLE OBTAINING METHOD, AND PROJECTION IMAGE CORRECTION METHOD

(75) Inventor: Hideaki Inoue, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 102 days.

(21) Appl. No.: 10/890,567

(22) Filed: Jul. 12, 2004

(65) Prior Publication Data

US 2005/0012907 A1    Jan. 20, 2005

(30) Foreign Application Priority Data

Jul. 15, 2003    (JP)    ............... 2003-275004

(51) Int. Cl.
*G03B 21/14* (2006.01)
*H04N 3/23* (2006.01)
*H04N 3/223* (2006.01)
*H04N 3/227* (2006.01)

(52) U.S. Cl. .................. 353/70; 353/69; 348/746; 348/747; 348/806

(58) Field of Classification Search ............ 353/69–70; 348/745–747, 806, 80
See application file for complete search history.

(56) References Cited

U.S. PATENT DOCUMENTS

| 5,455,647 | A | 10/1995 | Fujiwara |
| 6,230,070 | B1 | 5/2001 | Yodoshi |
| 6,310,662 | B1 | 10/2001 | Sunakawa et al. |
| 6,499,849 | B1 | 12/2002 | Huang |
| 6,520,647 | B1 | 2/2003 | Raskar |
| 6,522,393 | B1 | 2/2003 | Higashino |
| 6,741,279 | B1 | 5/2004 | Allen |
| 6,846,081 | B1 * | 1/2005 | Mochizuki et al. ........... 353/70 |
| 6,862,086 | B1 * | 3/2005 | Kanemitsu ............... 356/139.1 |
| 6,877,864 | B1 | 4/2005 | Tamura et al. |
| 2002/0021418 | A1 | 2/2002 | Raskar |
| 2002/0038462 | A1 | 3/2002 | Sakakibara et al. |
| 2002/0051095 | A1 | 5/2002 | Su |
| 2002/0135747 | A1 | 9/2002 | Higashino |
| 2003/0043303 | A1 | 3/2003 | Karuta et al. |
| 2003/0095239 | A1 | 5/2003 | Hirao et al. |
| 2004/0061848 | A1 * | 4/2004 | Kanemitsu et al. ...... 356/152.1 |
| 2004/0156033 | A1 * | 8/2004 | Kanemitsu ................. 356/3.01 |

(Continued)

FOREIGN PATENT DOCUMENTS

EP    0 689 353 A2    12/1995

(Continued)

OTHER PUBLICATIONS

U.S. Appl. No. 10/866, 299, filed Jun. 10, 2004, Inventor: M. Ogawa; Title: Projector With Tilt-Angle Detecting Capability.

*Primary Examiner*—W.B. Perkey
*Assistant Examiner*—Magda Cruz
(74) *Attorney, Agent, or Firm*—Frishauf, Holtz, Goodman & Chick, P.C.

(57) ABSTRACT

In a projector to which the present invention is applied, a distance sensor measures distances between the projector and a plurality of points on a screen. An angle calculation unit obtains a formula representing a screen surface, based on plural pieces of distance data representing results of measurement by the distance sensor, and obtains inclination angles $\theta_V$ and $\theta_H$ of the screen with respect to the light axis of a projection light. The angle calculation unit supplies the obtained inclination angles $\theta_V$ and $\theta_H$ to a trapezoidal correction unit. The trapezoidal correction unit performs trapezoidal correction by using the supplied inclination angles $\theta_V$ and $\theta_H$.

10 Claims, 15 Drawing Sheets

U.S. PATENT DOCUMENTS

| | | |
|---|---|---|
| 2004/0252283 A1* | 12/2004 | Ogawa ................. 353/69 |
| 2005/0012907 A1 | 1/2005 | Inoue |
| 2005/0024598 A1 | 2/2005 | Inoue |
| 2005/0052620 A1 | 3/2005 | Tamura |
| 2005/0078282 A1 | 4/2005 | Tamura |
| 2005/0163396 A1 | 7/2005 | Morichika et al. |
| 2005/0168706 A1 | 8/2005 | Sakai |

FOREIGN PATENT DOCUMENTS

| | | |
|---|---|---|
| EP | 0 974 811 A | 1/2000 |
| EP | 1 193 541 A2 | 4/2002 |
| EP | 1 391 778 A | 2/2004 |
| EP | 1426732 A1 * | 6/2004 |
| JP | 04-355740 A | 12/1992 |
| JP | 08-009309 A | 1/1996 |
| JP | 09-197249 Y | 7/1997 |
| JP | 2001-230991 A1 | 8/2001 |
| JP | 2001-339671 A | 12/2001 |
| JP | 2002-062842 A | 2/2002 |
| JP | 2003-029201 A | 1/2003 |
| WO | WO 00/21282 A1 | 4/2000 |
| WO | WO 02/101443 A2 | 12/2002 |
| WO | WO 03/017655 A1 | 2/2003 |

* cited by examiner

PROJECTOR

PROJECTOR APPARATUS, INCLINATION ANGLE OBTAINING METHOD, AND PROJECTION IMAGE CORRECTION METHOD

BACKGROUND OF THE INVENTION

1. Field of the Invention

The present invention relates to a projector apparatus, a method for obtaining an inclination angle of a projector, and a method for correcting a projection image.

2. Description of the Related Art

A projector is an apparatus for displaying an image on a screen. It projects a light toward a screen and displays an image on the screen.

When the projector is not inclined with respect to the ground planar surface and the screen stands perpendicular to the ground planar surface, an image is undistortedly displayed on the screen.

However, if the projector is inclined with respect to the ground planar surface, an image on the screen is distorted. To prevent this, some conventional projectors have an acceleration sensor inside. The acceleration sensor detects the inclination angle of the projector with respect to the ground planar surface. The projector performs trapezoidal correction based on the detected inclination angle. Such a projector is disclosed in, for example, Unexamined Japanese Patent Application KOKAI Publication No. 2001-339671 page 3 and FIG. 1.

However, actually, the screen is not necessarily perpendicular to the ground planar surface.

Therefore, to determine the correction amount for trapezoidal correction, not only the inclination angle of the projector with respect to the ground planar surface, but also the inclination angle of the projector with respect to an axis that is perpendicular to the screen are needed. If these inclination angles can be measured, trapezoidal correction can be performed.

Conventional projectors correct the distorted outline of an image to a correct outline in this manner.

However, conventional projectors have the following problems.

First, as described above, inclination angles needed for trapezoidal correction of an image are an inclination angle of the projector with respect to the ground planar surface, and an inclination angle of the projector with respect to the axis that is perpendicular to the screen. Therefore, even if the inclination angle of the projector with respect to the ground planar surface is detected but if the inclination angle of the projector with respect to the screen cannot accurately be measured or the measured result cannot be supplied to the projector, trapezoidal correction cannot accurately be performed.

Second, conventional projectors employing an acceleration sensor ignore the inclination angle of the screen with respect to the projector in a direction parallel to the ground planar surface. Actually, there can possibly be an inclination angle of the screen with respect to the projector in the horizontal direction. The acceleration sensor cannot detect the inclination angle of the screen with respect to the light axis of a projected light. Therefore, conventional projectors employing an acceleration sensor cannot perform trapezoidal correction based on the inclination angle of the screen with respect to the projector in the horizontal direction.

The disclosure of the above-indicated document is incorporated herein.

SUMMARY OF THE INVENTION

An object of the present invention is to provide a projector apparatus capable of accurately correcting a projection image to be displayed on a screen, a method for obtaining an inclination angle of a projector, and a method for correcting a distortion of an image.

One of the preferred embodiments of the present invention is a projector apparatus comprising:

a distance measuring unit which measures distances between itself and a plurality of measurement points on a screen and outputs plural pieces of distance data representing measurement results;

an angle obtaining unit which obtains a screen formula representing a positional relation between a light axis of a projection light projected from the projector apparatus and the screen onto which the projection light is projected, by using the plural pieces of distance data output from the distance measuring unit, and obtains an inclination angle of the light axis with respect to a surface of the screen by using the obtained screen formula;

a correction unit which corrects a distortion of a projection image which is to be displayed on the surface of the screen by using the inclination angle of the light axis with respect to the surface of the screen obtained by the angle obtaining unit; and a projection unit which converts the projection image corrected by the correction unit into a projection light and projects the projection image on the surface of the screen.

Another one of the preferred embodiments of the present invention is a projector apparatus comprising:

a plurality of distance measuring units which each measure distances between themselves and a plurality of measurement points positioned on each of a plurality of measurement lines on a screen which lines intersect with each other, and each output plural pieces of distance data representing measurement results;

an angle obtaining unit which obtains inclination angles of the plurality of measurement lines with respect to a surface perpendicular to a light axis of a projection light projected from the projector apparatus, by using the plural pieces of distance data output from the plurality of distance measuring units respectively, and obtains an inclination angle of the light axis with respect to a surface of the screen by using the plurality of obtained inclination angles;

a correction unit which corrects a distortion of a projection image to be displayed on the surface of the screen by using the inclination angle of the light axis with respect to the surface of the screen obtained by the angle obtaining unit; and a projection unit which converts the projection image corrected by the correction unit into a projection light and projects the projection image on the surface of the screen.

Another one of the preferred embodiments of the present invention is an inclination angle obtaining method for obtaining an inclination angle of a projector apparatus with respect to a surface of a screen, comprising:

a measuring step of measuring distances between the projector apparatus and a plurality of measurement points on the screen;

a screen formula obtaining step of obtaining a screen formula representing a positional relation between a light axis of a projection light projected from the projector apparatus and the surface of the screen onto which the projection light is projected, by using plural pieces of distance data representing measurement results in the measuring step; and an inclination angle obtaining step of obtaining inclination angles of the surface of the screen with respect to the light axis by using the obtained screen formula.

Another one of the preferred embodiments of the present invention is an inclination angle obtaining method for obtaining an inclination angle of a projector apparatus with respect to a surface of a screen, comprising:

a measuring step of measuring distances between the projector apparatus and a plurality of measurement points positioned on each of a plurality of measurement lines on the screen which lines intersect with each other;

an angle obtaining step of obtaining an angle formed between an ideal screen surface perpendicular to a light axis of the projector apparatus and each of the plurality of measurement lines; and an angle interpreting step of interpreting each angle obtained in the angle obtaining step into an inclination angle of the light axis of the projector apparatus with respect to the surface of the screen.

Another one of the preferred embodiments of the present invention is a projection image correction method for correcting a distortion of a projection image, comprising:

a measuring step of measuring distances between a predetermined reference point and a plurality of measurement points on a screen;

a screen formula obtaining step of obtaining a screen formula representing a positional relation between a light axis of a projection light to be projected on the screen and the screen, by using plural pieces of distance data representing measurement results in the measuring step;

an inclination angle obtaining step of obtaining an inclination angle of the light axis with respect to a surface of the screen by using the obtained screen formula; and a correcting step of correcting a distortion of a projection image to be displayed on the surface of the screen, by using the inclination angle of the light axis with respect to the surface of the screen which is obtained in the inclination angle obtaining step.

Another one of the preferred embodiments of the present invention is a projection image correction method for correcting a distortion of a projection image, comprising:

a measuring step of measuring distances between a projector and a plurality of measurement points positioned on each of a plurality of measurement lines on a screen which lines intersect with each other;

an angle obtaining step of obtaining an angle formed between an ideal screen surface perpendicular to a light axis of the projector and each of the plurality of measurement lines;

an angle interpreting step of interpreting each angle obtained in the angle obtaining step into an inclination angle of the light axis of the projector with respect to a surface of the screen; and a correcting step of correcting a distortion of a projection image to be displayed on the surface of the screen, by using the inclination angles of the light axis of the projector with respect to the surface of the screen which inclination angles are obtained by interpretation in the angle interpreting step.

The projector to which the present invention is applied can accurately perform correction of a projection image focused on a screen.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Projectors according to the embodiments of the present invention will be explained with reference to the drawings.

(First Embodiment)

Figure 1:
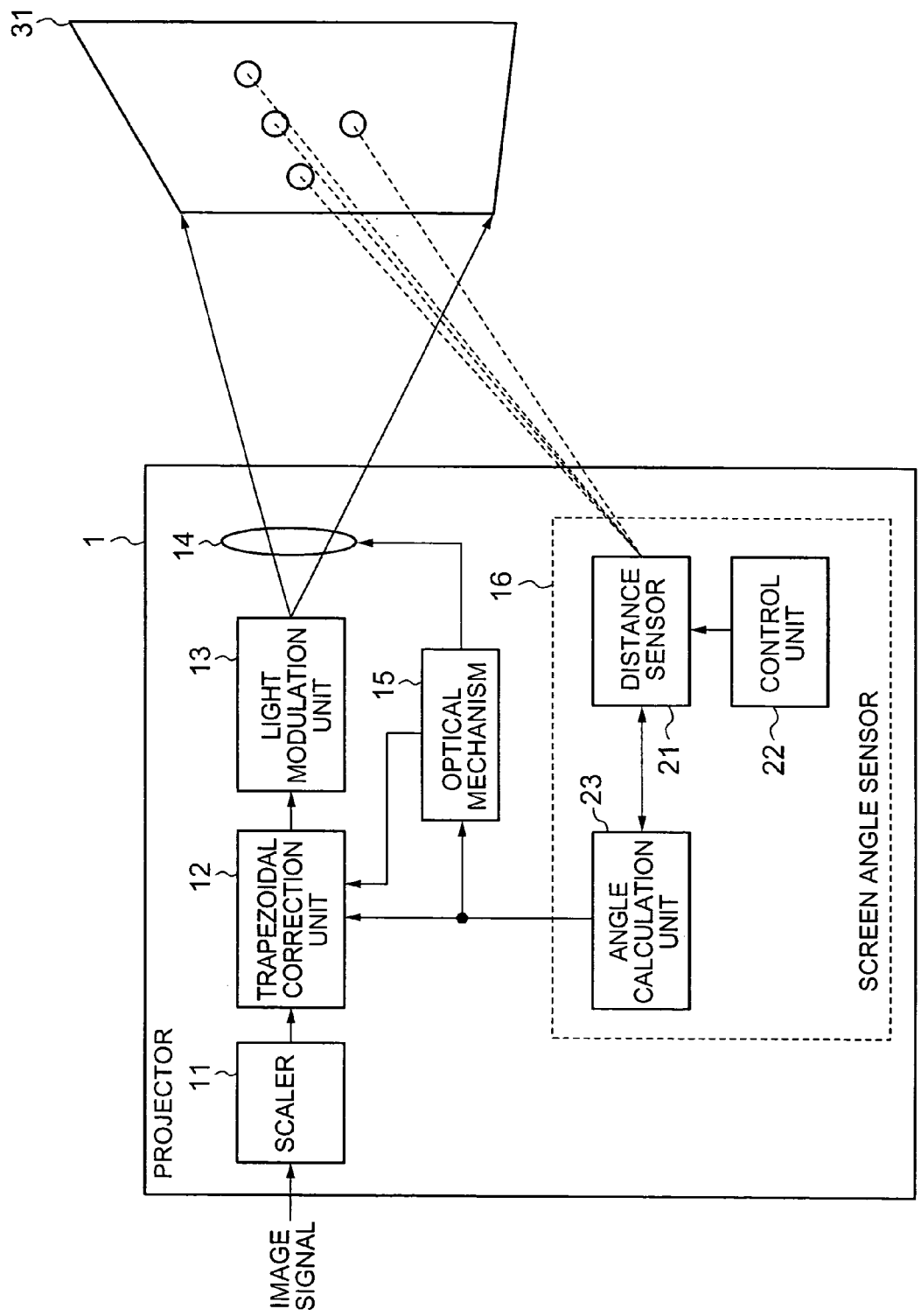
FIG. 1 is a block diagram showing a configuration of a projector according to a first embodiment of the present invention.

The configuration of a projector according to the first embodiment of the present invention is shown in FIG. 1.

The projector 1 according to the first embodiment comprises a scaler 11, a trapezoidal correction unit 12, a light modulation unit 13, a projection lens 14, an optical mechanism 15, and a screen angle sensor 16.

The scaler 11 adjusts the resolution of an image signal.

The trapezoidal correction unit 12 performs trapezoidal correction on an image signal having its resolution corrected by the scaler 11.

The trapezoidal correction unit 12 sets the position and shape of a post-correction projection image inside a pre-correction projection image which is projected on a screen 31, based on inclination angles $\theta_V$ and $\theta_H$ of the surface of the screen 31 which are supplied from the screen angle sensor 16. Then, the trapezoidal correction unit 12 performs trapezoidal correction by projectively transforming an image signal temporally continuously. The inclination angle $\theta_V$ represents an inclination of the screen 31 in a vertical direction, with respect to the light axis of a projected light. The inclination angle $\theta_H$ represents an inclination of the screen 31 in a horizontal direction, with respect to the light axis.

The trapezoidal correction unit 12 obtains a correction amount for correcting a projected image, according to a translation table for translating the inclination angles $\theta_V$ and $\theta_H$ into a correction amount for correcting a projected image. Then, the trapezoidal correction unit 12 outputs an image signal after being corrected. In case of using a translation table, the trapezoidal correction unit 12 has a memory for storing a pre-generated translation table. Instead, the trapezoidal correction unit 12 may be configured to perform trapezoidal correction using a formula representing the screen plane each time the inclination angles $\theta_V$ and $\theta_H$ are supplied. For generating a translation table: (1) the shape of a quadrangle before being corrected is obtained based on the inclination angles $\theta_V$ and $\theta_H$ and the zooming magnification; (2) a quadrangle obtained after correction is defined inside the quadrangle before being corrected, and the coordinates of the quadrangle obtained after correction are obtained; (3) the coordinates of the quadrangle before being corrected are obtained based on the coordinates of the quadrangle obtained after correction by inverse transformation of coordinates, thereby the manner of transformation is determined; and (4) a circuit parameter is derived from the coordinates obtained by inverse transformation (this parameter is derived in advance and stored in a memory as the translation table). In a case where the transformation table is not used, the same correction operation is realized by performing the processes of (1) to (4) as needed.

The light modulation unit 13 converts the image signal after being corrected which is output from the trapezoidal correction unit 12 into a projection light. For example, a transmission type or reflection type liquid crystal panel or a digital micromirror device (DMD) is used as the light modulation unit 13.

The projection lens 14 displays the image, which is converted from the post-correction image signal into a light by the light modulation unit 13, on the screen 31.

The optical mechanism 15 controls the focus, etc. of the projection lens 14, based on the inclination angles $\theta_V$ and $\theta_H$ detected by the screen angle sensor 16. In a case where the projector 1 has a zooming mechanism, the optical mechanism 15 also performs zooming control, and feeds information-on the zooming magnification to the trapezoidal correction unit 12. The zooming magnification of the projector 1 is a value that is obtained by multiplying a ratio of a projection distance and size of a projected image by a constant (zooming magnification∝width of the projected image÷projection distance=2×tan(half angle of view)).

If a zooming variable range in which zooming magnification can be varied is wide, changes in the correction amounts for trapezoidal correction based on zooming magnification are unignorably large. Therefore, the trapezoidal correction unit 12 performs trapezoidal correction by also using the zooming magnification supplied from the optical mechanism 15.

However, in a case where the projector 1 does not include a zooming mechanism or the projector 1 does include a zooming mechanism but the zooming variable range is narrow, the trapezoidal correction unit 12 performs trapezoidal correction by regarding the zooming magnification as constant.

The screen angle sensor 16 detects the inclination angles $\theta_V$ and $\theta_H$ of the surface of the screen 31 with respect to the light axis of a light projected by the projector 1. The screen angle sensor 16 comprises a distance sensor 21, a control unit 22, and an angle calculation unit 23.

The distance sensor 21 measures the distances between the projector 1 and a plurality of measurement points on the screen 31. The distance sensor 21 outputs distance data representing the measurement results. It suffices if the distance sensor 21 can measure the distances between the projector 1 and at least three measurement points on the screen 31. The distance sensor 21 may be an active type one or may be a passive type one.

The control unit 22 controls the distance sensor 21 to measure the distances between the projector 1 and a plurality of points on the screen 31. In order to measure the distances, the control unit 22 projects infrared light spots (in case of an active type) or predetermined image patterns (in case of a passive type) on the screen 31.

Figure 2:
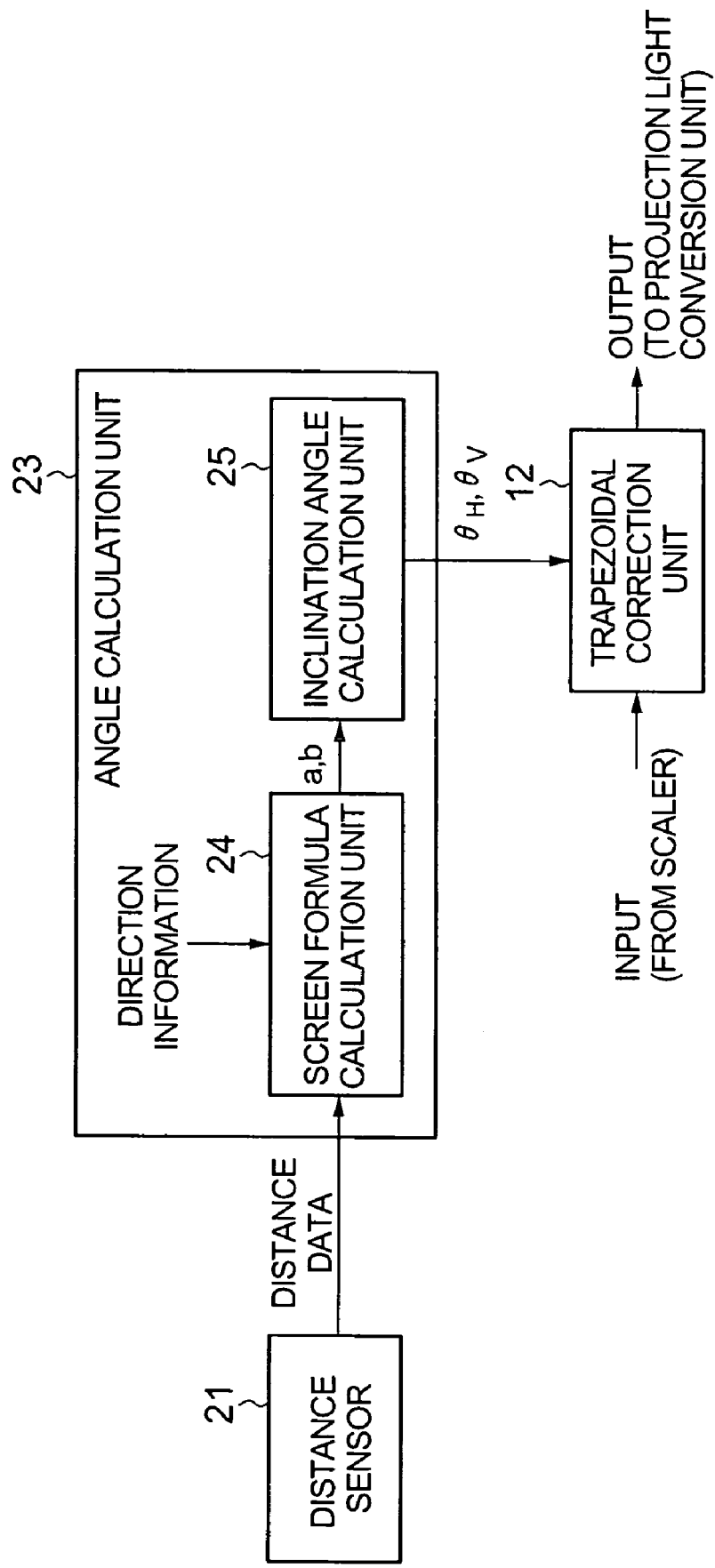
FIG. 2 is a block diagram showing a configuration of an angle calculation unit shown in FIG. 1.

The angle calculation unit 23 calculates the inclination angles $\theta_V$ and $\theta_H$ of the screen 31 based on the distance data representing the distances between the projector 1 and the plurality of measurement points on the screen 31 measured by the distance sensor 21. The angle calculation unit 23 is constituted by, for example, a digital signal processor (DSP) or a computer. As shown in FIG. 2, the angle calculation unit 23 comprises a screen formula calculation unit 24, and an inclination angle calculation unit 25.

The screen formula calculation unit 24 derives a formula representing the screen plane of the screen 31 based on the distance data regarding a plurality of measurement points. The inclination angle calculation unit 25 calculates the inclination angles $\theta_V$ and $\theta_H$ of the screen 31 by using the formula representing the screen plane derived by the screen formula calculation unit 24.

Here, explanation will be given to the inclination angles $\theta_V$ and $\theta_H$ in each of the cases where the origin of a coordinate system is set on the center of the projector 1 and where the origin of a coordinate system is set on the surface of the screen 31. The coordinate system is a three-dimensional orthogonal coordinate system consisting of x, y, and z axes.

Figure 3:
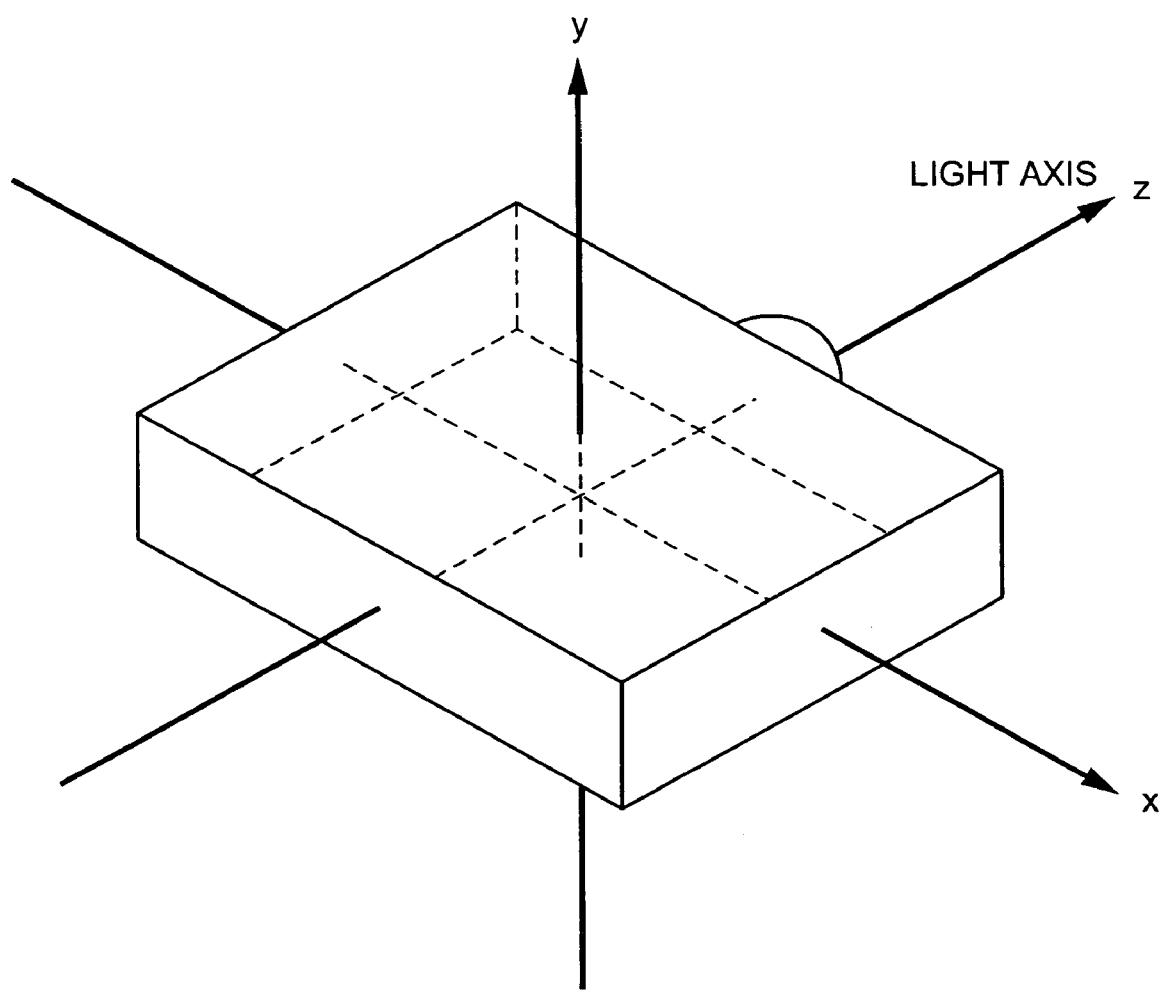
FIG. 3 is a diagram showing a coordinate system of a projector.

First, the case where the origin of the coordinate system is set on the center of the projector 1 as shown in FIG. 3 will be explained. If the screen 31 is perpendicular to the z axis and parallel with the x and y axes, it is present at a position z=d (d>0). FIG. 3 to FIG. 7 are drawn such that the position of the entrance pupil of the projection lens 14 coincides with the origin of the coordinate system.

Consider a case where the screen 31 is not inclined but the projector 1 is inclined. In this case, it is assumed that the screen 31 is present at a position z=d.

Figure 4:
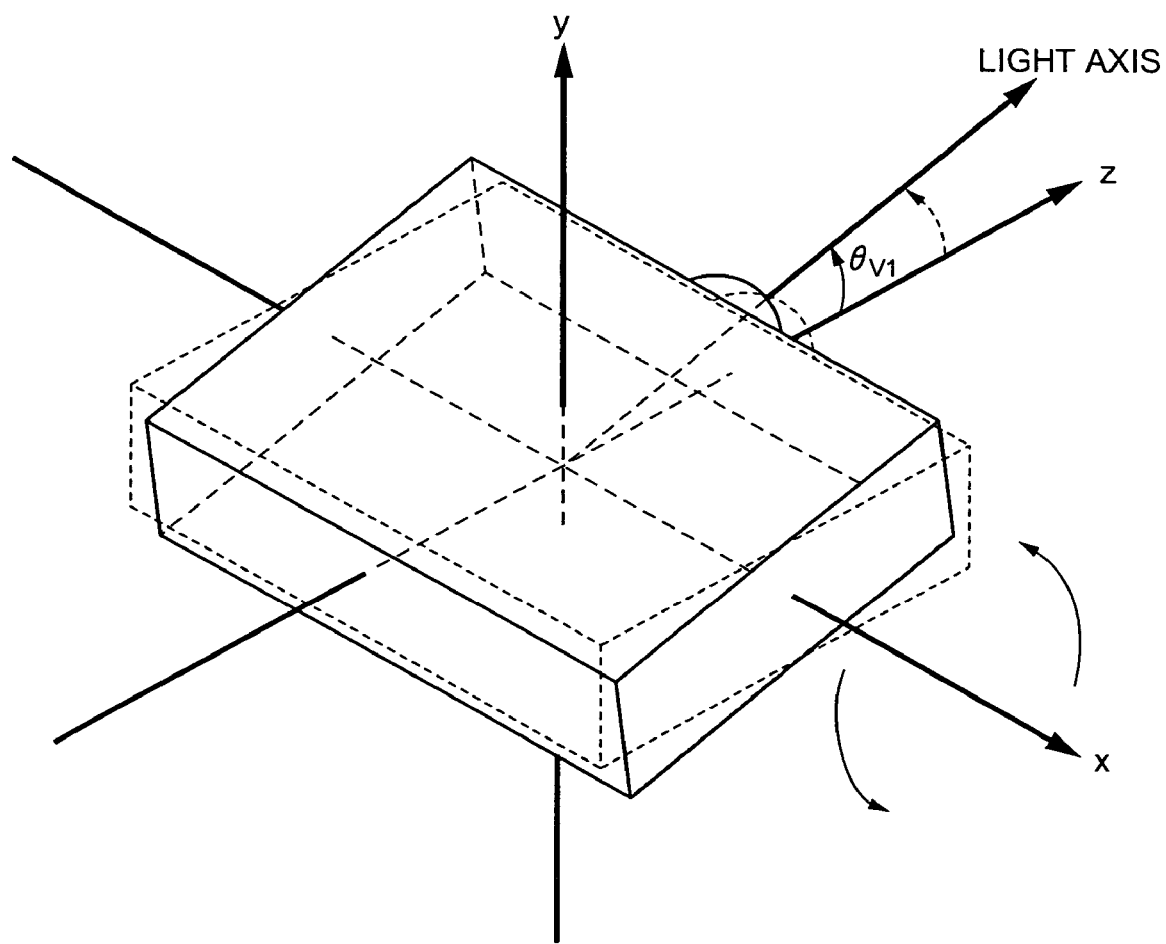
FIG. 4 is a diagram showing a state where the projector is rotated about the x axis in the coordinate system shown in FIG. 3.
Figure 5:
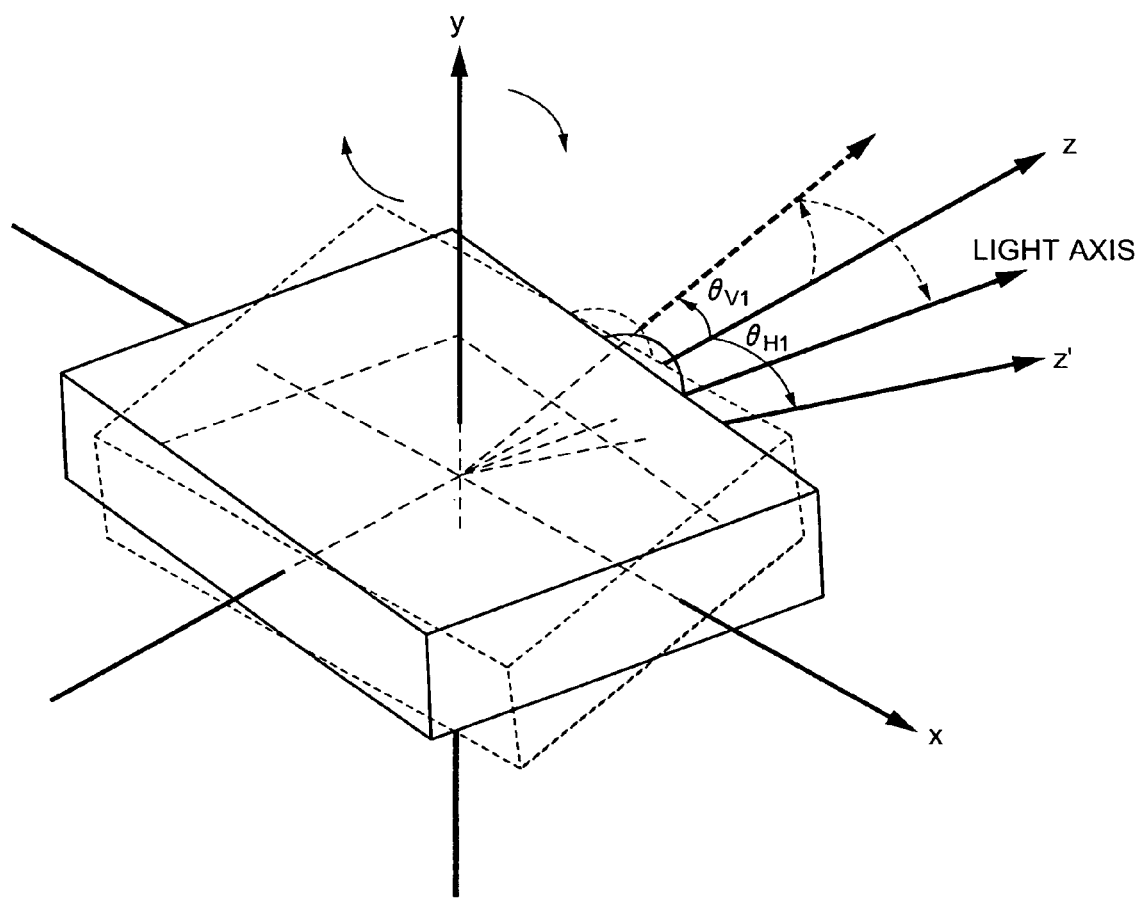
FIG. 5 is a diagram showing a state where the projector is rotated about the y axis after it is rotated about the x axis in the coordinate system shown in FIG. 3.

The matter that must be paid attention at this time is the order of inclining the projector 1. In a case where the projector 1 is to be inclined, first, the projector 1 is inclined by an inclination angle $\theta_{V1}$ about the x axis as a rotation axis, as shown in FIG. 4. Then, the projector 1 is inclined by an inclination angle $\theta_{H1}$ about the y axis as a rotation axis, as shown in FIG. 5. Note that the z' axis in FIG. 5 is one that is reached by inclining the z axis by the inclination angle $\theta_{H1}$ about the y axis as a rotation axis. The light axis of a light projected from the projector 1 is present above the z' axis in the range of z>0.

The inclination angle $\theta_{V1}$ shown in FIG. 4 and FIG. 5 is an angle formed between the light axis of a light projected from the projector 1 and the z axis, in a case where the projector 1 is rotated about the x axis. The inclination angle $\theta_{H1}$ shown in FIG. 5 is an angle formed between the z axis and the z' axis which is the map to the z-x plane of the light axis of a light projected from the projector 1 in a case where the projector 1 is further rotated about the y axis.

Figure 6:
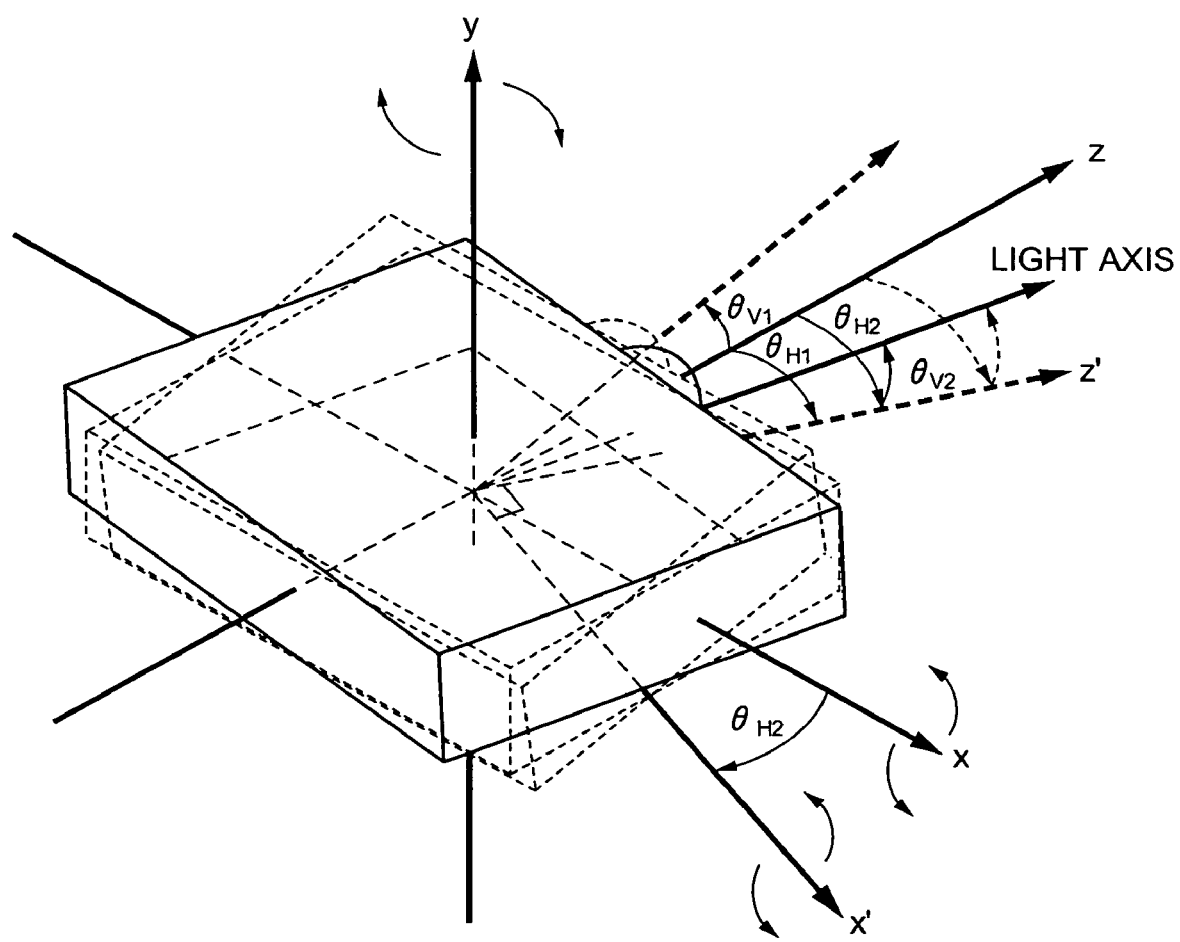
FIG. 6 is a diagram for explaining a method for obtaining an inclination angle of a screen with respect to a light axis.
Figure 7:
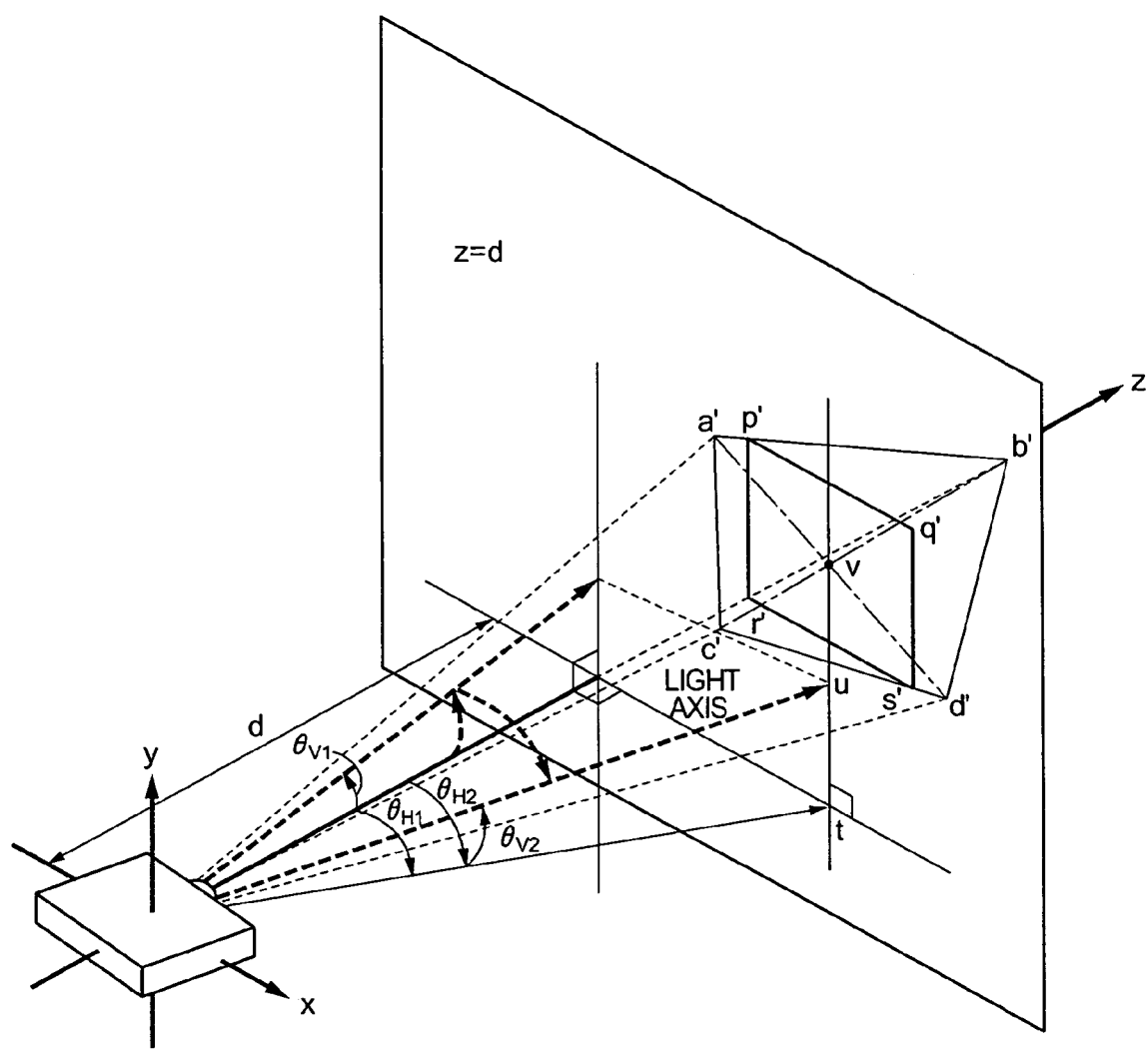
FIG. 7 is a diagram for explaining a positional relation between the inclination angle shown in FIG. 6 and an image on the screen.

In a case where the order of rotation is reversed, that is, in a case where the projector 1 is inclined by an inclination angle $\theta_{H2}$ about the y axis as a rotation axis and then is inclined by an inclination angle $\theta_{V2}$ about the x' axis as a rotation axis, as shown in FIG. 6 and FIG. 7, the values of the inclination angles $\theta_{H1}$ and $\theta_{H2}$, and the values of the inclination angles $\theta_{V1}$ and $\theta_{V2}$ are the same respectively.

However, note that if the projector 1 is rotated first about the y axis as the rotation axis, the rotation axis about which the projector 1 is rotated next is the x' axis which is reached by inclining the x axis about the y axis as the rotation axis by the inclination angle $\theta_{H2}$.

With reference to FIG. 6 and FIG. 7, it is known that even if the order of rotation is reversed, but if the axis of rotation is not mistaken, the same state will appear.

In FIG. 7, "d" represents the distance between the center of the projector 1 and the screen 31. Two quadrangles on the screen 31 are the projected images after the projector 1 is rotated. A quadrangle a'b'c'd' represents a projected image in a case where the trapezoidal correction unit 12 does not perform trapezoidal correction. A quadrangle p'q'r's' represents a projected image in a case where the trapezoidal correction unit 12 performs trapezoidal correction.

As shown in FIG. 7, by the trapezoidal correction unit 12 performing trapezoidal correction, the quadrangle a'b'c'd' is converted into the quadrangle p'q'r's'.

A point "t" represents a temporary intersection of the screen 31 and the light axis of the projector 1 in a case where the projector 1 is rotated first about the y axis by the inclination angle $\theta_{H2}$. A point "u" represents an actual intersection of the screen 31 and the light axis of the projector 1 in a case where the projector 1 is first rotated about the x axis by the inclination angle $\theta_{V1}$ and then rotated about the y axis by the inclination angle $\theta_{H1}$. A point "v" represents the intersection of the two diagonal lines of the quadrangle a'b'c'd'.

As shown in FIG. 7, the point "u" is positioned right above the point "t" which is the temporary intersection, and the point "v" is positioned right above the point "u". Therefore, the explanation will become easier to understand if the inclination angles are represented by $\theta_{H2}$ and $\theta_{V2}$.

Next, a case where not the projector 1 but the screen 31 is inclined will be considered.

Figure 8:
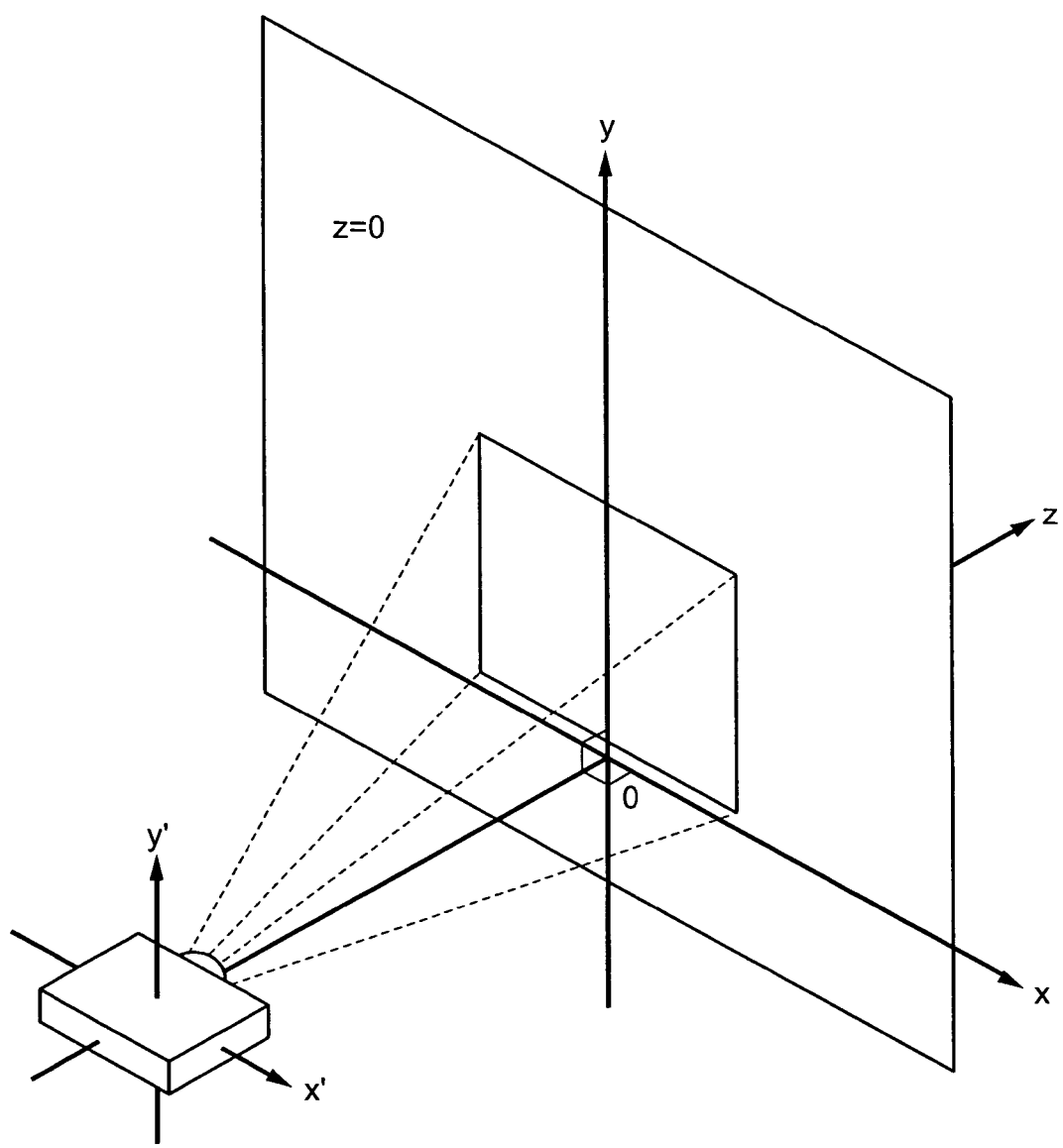
FIG. 8 is a diagram showing a coordinate system set on the screen.

FIG. 8 shows a state before the screen 31 is inclined. For easy understanding, the coordinate system is set as shown in FIG. 8. Specifically, the origin of the coordinate system is set as a point O on the screen 31. For easier understanding, the point O is assumed to be an intersection of the light axis of a light projected from the projector 1 and the screen 31.

In this case, the formula representing the screen plane is z=0.

Figure 9:
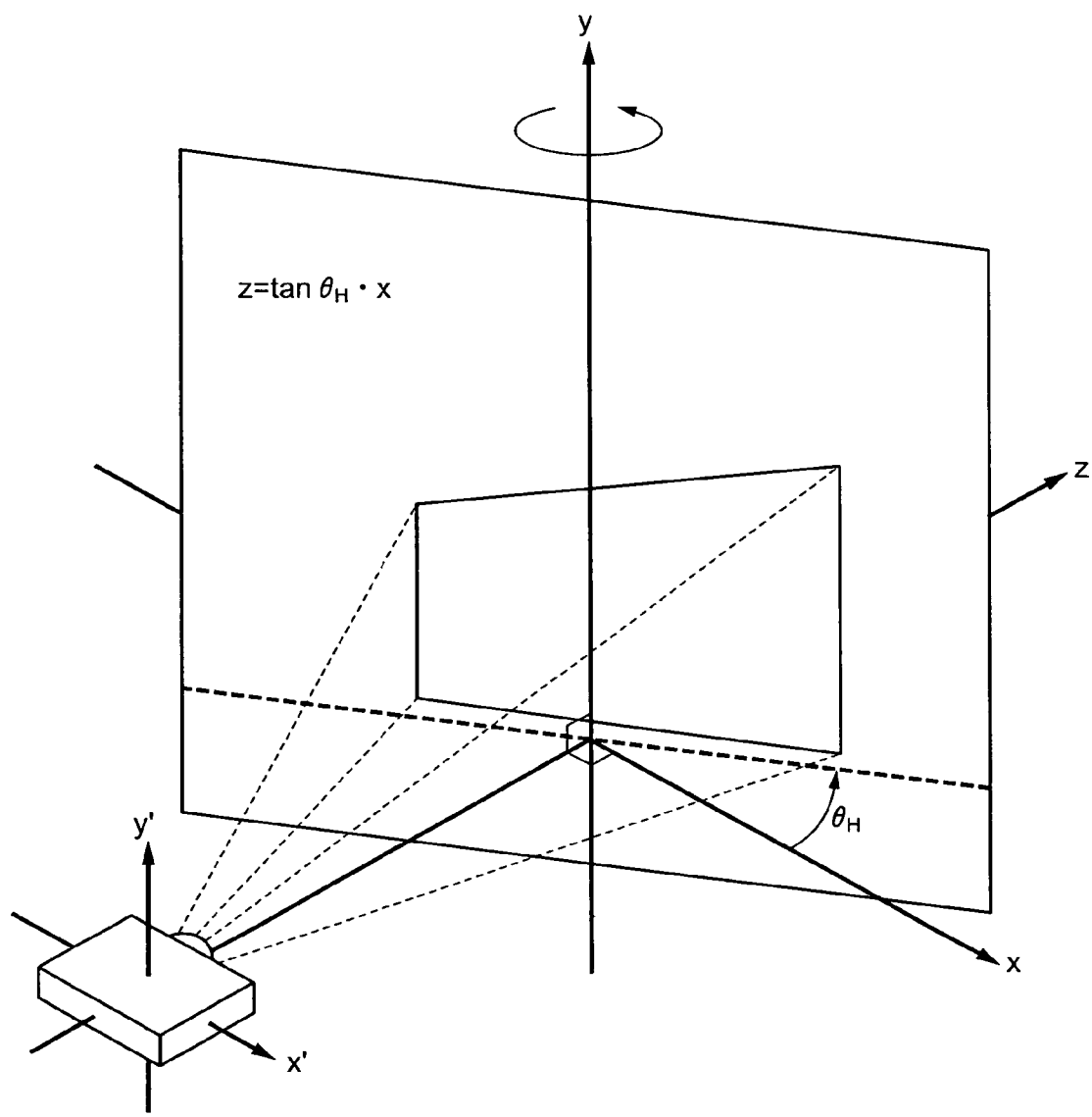
FIG. 9 is a diagram showing a state where the screen is rotated about the y axis in the coordinate system shown in FIG. 8.

If the screen 31 is rotated about the y axis by an inclination angle $\theta_H$ as shown in FIG. 9, the plane of the screen 31 is represented by the following formula 15.

$$z = \tan\theta_H \cdot x \qquad \text{[Formula 15]}$$

Figure 10:
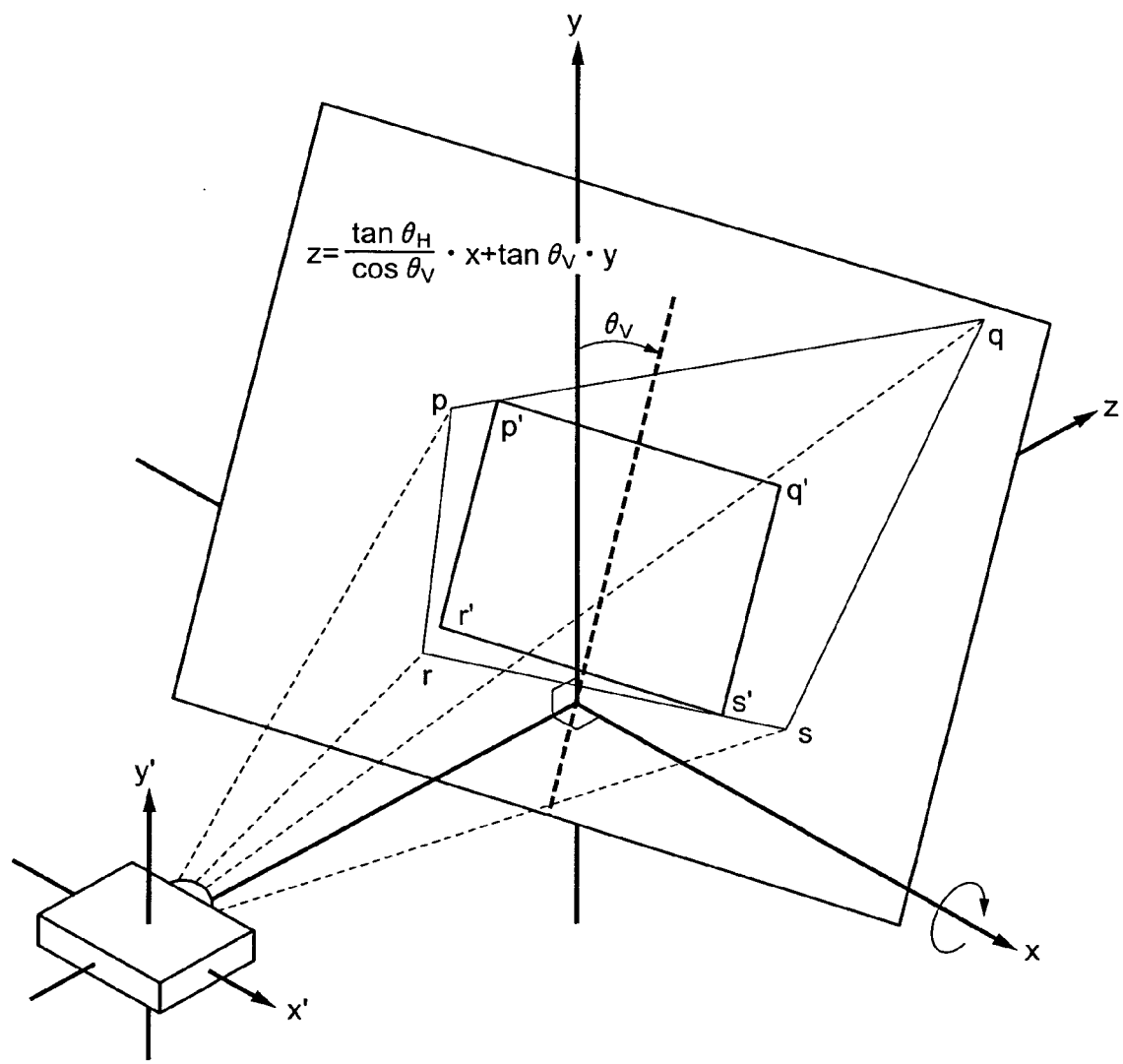
FIG. 10 is a diagram showing a state where the screen is rotated about the x axis after it is rotated about the y axis in the coordinate system shown in FIG. 8.

If the screen 31 is further rotated about the x axis by an inclination angle $\theta_V$ as shown in FIG. 10, the formula 15 is changed to the following formula 16.

$$z = \frac{\tan\theta_H}{\cos\theta_V} \cdot x + \tan\theta_V \cdot y \qquad \text{[Formula 16]}$$

What matters here is the order of rotation. It is necessary to make the order of rotation reverse to the order of rotating the projector 1 shown in FIG. 3 to FIG. 5. That is, as shown in FIG. 9 and FIG. 10, the screen 31 is rotated first about the y axis by the inclination angle $\theta_H$ and then rotated about the x axis by the inclination angle $\theta_V$.

Due to this, the inclination angles $\theta_V$ and $\theta_H$ in the formula 16 coincide with the inclination angles $\theta_{H1}$ and $\theta_{V1}$ shown in FIG. 6 and FIG. 7. That is, in both of the cases where the origin of a coordinate system is set on the center of the projector 1 and the projector 1 is inclined and where the origin of a coordinate system is set on the plane of the screen 31 and the screen 31 is inclined, the inclination angles $\theta_{H1}$ and $\theta_{V1}$ of the projector 1 and the inclination angles $\theta_V$ and $\theta_H$ of the screen 31 coincide with each other respectively.

Next, a method of calculating the inclination angles $\theta_V$ and $\theta_H$ based on distance data representing the distance between the projector 1 and a measurement point on the screen 31 will be explained.

The screen plane of the screen 31 is represented by the following formula 17. The coordinate system used here is a three-dimensional orthogonal coordinate system which consists of x, y, and z axes and whose origin is the center of the projector 1.

$$z = ax + by + c \qquad \text{[Formula 17]}$$

(a, b, and c are constants)

If there are direction information regarding a preset direction and plural pieces of distance data, three-dimensional coordinates (x, y, z) of a measurement point on the screen 31 can be obtained. If there are three sets of direction information and distance data pieces, three sets of three-dimensional coordinates (x1, y1, z1), (x2, y2, z2), and (x3, y3, z3) can be obtained.

In this case, three-dimensional simultaneous equations are established based on the formula 17. The coefficients a, b, and c in the formula 17 can be obtained by solving these simultaneous equations. Since the coefficient "c" represents a parallel move in the direction of the z axis, there is no need of finding the coefficient "c".

By comparing the formula 16 with the formula 17, it is known that the coefficients "a" and "b" are represented by the following formulae 18.

$$a = \frac{\tan\theta_H}{\cos\theta_V} \qquad \text{[Formulae 18]}$$
$$b = \tan\theta_V$$

According to the formulae 18, the inclination angles $\theta_V$ and $\theta_H$ are represented by the following formulae 19.

$$\theta_V = \arctan(b)$$
$$\theta_H = \arctan(a \cdot \cos\theta_V) \qquad \text{[Formulae 19]}$$

By using the formulae 19, the inclination angles $\theta_V$ and $\theta_H$ can be obtained.

Next, a specific method of obtaining the inclination angles $\theta_V$ and $\theta_H$ based on plural pieces of distance data will be explained.

In order to obtain the inclination angles $\theta_V$ and $\theta_H$ based on plural pieces of distance data, (1) the coordinates of measurement points are obtained by using the distance data, (2) equation representing the screen plane is obtained based on the coordinates of the measurement points, and (3) the inclination angles $\theta_V$ and $\theta_H$ are obtained based on the equation representing the screen plane. These procedures will be explained in this order.

(1) To Obtain Coordinates of Measurement Points by Using Distance Data

Figure 11:
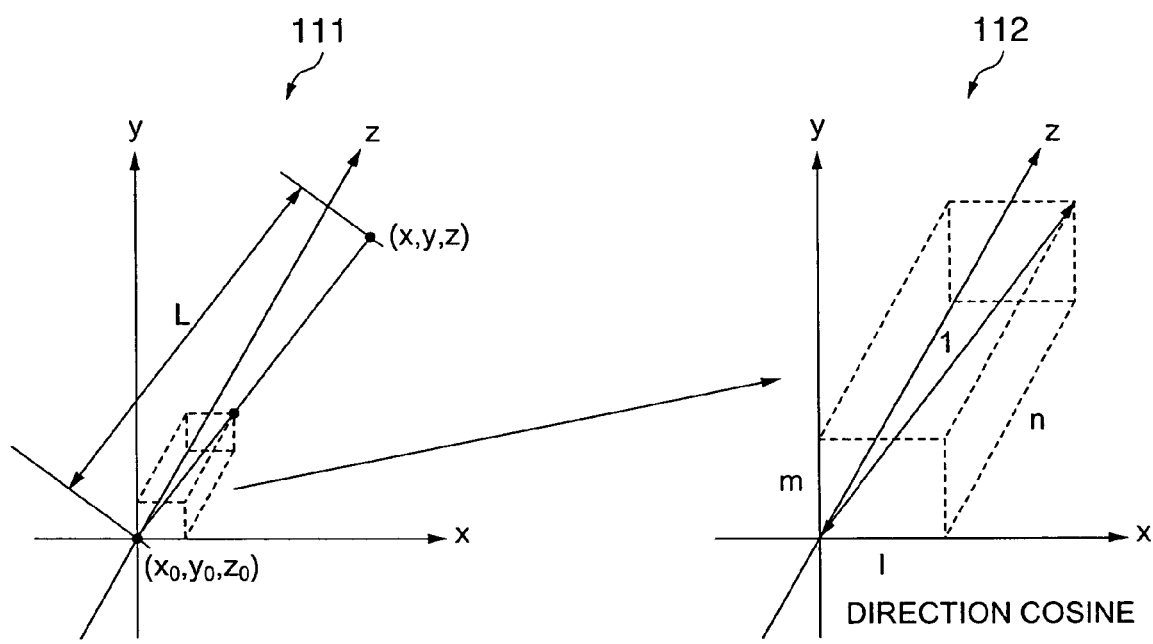
FIG. 11 is a diagram for explaining a method for obtaining coordinates of a measurement point based on distance data.

Assume that the coordinates of a preset light projecting point of the distance sensor 21 are represented as (x0, y0, z0) as indicated by "111" of FIG. 11; and the direction cosines of the direction in which the distance sensor 21 projects a light are represented as "l", "m", and "n" as indicated by "112" of FIG. 11. In this case, the coordinates (x, y, z) of a measurement point are represented by the following formulae 20. Note that "L" in FIG. 11 represents the distance between the projector 1 and the measurement point which is obtained based on the distance data. The light projecting point means a light emitting point of an active type distance sensor.

$$x = x0 + L \times l$$
$$y = y0 + L \times m$$
$$z = z0 + L \times n \quad \text{[Formulae 20]}$$

(2) To Obtain an Equation Representing the Screen Plane of the Screen 31 onto Which a Light is Projected, by Using the Coordinates of the Measurement Points In a case where there are three measurement points, assume that the three-dimensional coordinates of the three points are (x1, y1, z1), (x2, y2, z2), and (x3, y3, z3) respectively. In this case, the following simultaneous equations 21 are established according to the formula 17 representing the screen plane.

$$\begin{pmatrix} z1 \\ z2 \\ z3 \end{pmatrix} = \begin{pmatrix} x1 & y1 & 1 \\ x2 & y2 & 1 \\ x3 & y3 & 1 \end{pmatrix} \begin{pmatrix} a \\ b \\ c \end{pmatrix} \quad \text{[Simultaneous Equations 21]}$$

By solving these simultaneous equations 21, the coefficients a, b, and c are represented by the following formulae 22.

[Formulae 22]

$$a = \frac{y2 \cdot z1 - y1 \cdot z2 + y3 \cdot z2 - y2 \cdot z3 + y1 \cdot z3 - y3 \cdot z1}{x1 \cdot y2 - x2 \cdot y1 + x2 \cdot y3 - x3 \cdot y2 + x3 \cdot y1 - x1 \cdot y3}$$

$$b = \frac{x1 \cdot z2 - x2 \cdot z1 + x2 \cdot z3 - x3 \cdot z2 + x3 \cdot z1 - x1 \cdot z3}{x1 \cdot y2 - x2 \cdot y1 + x2 \cdot y3 - x3 \cdot y2 + x3 \cdot y1 - x1 \cdot y3}$$

$$c = \frac{x1 \cdot y2 \cdot z3 - x1 \cdot y3 \cdot z2 + x2 \cdot y3 \cdot z1 - x2 \cdot y1 \cdot z3 + x3 \cdot y1 \cdot z2 - x3 \cdot y2 \cdot z1}{x1 \cdot y2 - x2 \cdot y1 + x2 \cdot y3 - x3 \cdot y2 + x3 \cdot y1 - x1 \cdot y3}$$

In a case where there are more than three measurement points, an approximate solution of the screen plane can be obtained by using the least-square method.

In this case, if the coordinates of the measurement point are assumed to be (xi, yi, zi), s0, . . . , s8 are obtained according to the following formulae 23.

$$s0 = N \qquad s4 = \sum_{i=1}^{N} x_i^2 \qquad s8 = \sum_{i=1}^{N} y_i z_i \quad \text{[Formulae 23]}$$

$$s1 = \sum_{i=1}^{N} x_i \qquad s5 = \sum_{i=1}^{N} x_i y_i$$

$$s2 = \sum_{i=1}^{N} y_i \qquad s6 = \sum_{i=1}^{N} x_i z_i$$

$$s3 = \sum_{i=1}^{N} z_i \qquad s7 = \sum_{i=1}^{N} y_i^2$$

The screen plane of the case where there are more than three measurement points is represented by the following formula 24 by using s0, . . . , s8 obtained from the formulae 23.

$$\begin{pmatrix} s6 \\ s8 \\ s3 \end{pmatrix} = \begin{pmatrix} s4 & s5 & s1 \\ s5 & s7 & s2 \\ s1 & s2 & s0 \end{pmatrix} \begin{pmatrix} a \\ b \\ c \end{pmatrix} \quad \text{[Formula 24]}$$

If the formula 24 is solved as the coefficients a, b, and c, these coefficients will be represented by the following formulae 25.

[Formulae 25]

$$a = \frac{s_1(s_2 \cdot s_8 - s_3 \cdot s_7) + s_5(s_2 \cdot s_3 - s_0 \cdot s_8) + s_6(s_0 \cdot s_7 - s_2^2)}{s_4(s_2^2 - s_0 \cdot s_7) + s_1^2 \cdot s_7 + s_0 \cdot s_5^2 - 2 \cdot s_1 \cdot s_2 \cdot s_5}$$

$$b = \frac{s_4(s_2 \cdot s_3 - s_0 \cdot s_8) + s_1^2 \cdot s_8 + (s_0 \cdot s_5 - s_1 \cdot s_2)s_6 + s_1 \cdot s_3 \cdot s_5}{s_4(s_2^2 - s_0 \cdot s_7) + s_1^2 \cdot s_7 + s_0 \cdot s_5^2 - 2 \cdot s_1 \cdot s_2 \cdot s_5}$$

$$c = \frac{s_4(s_3 \cdot s_7 - s_2 \cdot s_8) + s_1 \cdot s_5 \cdot s_8 + s_6(s_2 \cdot s_5 - s_1 \cdot s_7) - s_3 \cdot s_5^2}{s_4(s_2^2 - s_0 \cdot s_7) + s_1^2 \cdot s_7 + s_0 \cdot s_5^2 - 2 \cdot s_1 \cdot s_2 \cdot s_5}$$

Note that in the case where there are thee measurement points, solving the formula 24 is equal to solving the simultaneous equations 21.

(3) To Obtain the Inclination Angles $\theta_V$ and $\theta_H$

The inclination angles $\theta_V$ and $\theta_H$ are obtained from the above formulae 19.

As explained above, the inclination angles $\theta_V$ and $\theta_H$ can be obtained based on plural pieces of distance data by using the formulae 19 to 25.

The screen formula calculation unit 24 calculates the coefficients "a" and "b" according to the formulae 20 to 25, and supplies the calculated coefficients "a" and "b" to the inclination angle calculation unit 25.

The inclination angle calculation unit 25 calculates the inclination angles $\theta_V$ and $\theta_H$ of the screen 31 by using the supplied coefficients "a" and "b" according to the formulae 19. The angle calculation unit 23 supplies the inclination angles $\theta_V$ and $\theta_H$ calculated by the inclination angle calculation unit 25 to the trapezoidal correction unit 12.

The angle calculation unit 23 may be configured to pre-calculate the inclination angles $\theta_V$ and $\theta_H$ according to the formulae 19 to 25. In this case, the inclination angle calculation unit 25 includes a memory, and stores a translation table which is pre-generated according to the formulae 19 and 25 for associating plural pieces of distance data with the inclination angles $\theta_V$ and $\theta_H$ in the memory.

Next, an operation of the projector 1 according to the first embodiment will be explained.

Under the control of the control unit 22, the distance sensor 21 of the screen angle sensor 16 measures the distances between the projector 1 and a plurality of measurement points on the screen 31. The distance sensor 21 supplies distance data representing the results of measuring the distances to the angle calculation unit 23.

As described above, the screen formula calculation unit 24 of the angle calculation unit 23 calculates the coefficients "a" and "b" according to the formulae 20 to 25. The inclination angle calculation unit 25 calculates the inclination angles $\theta_V$ and $\theta_H$ of the screen 31 by using the formulae 19 and the calculated coefficients "a" and "b".

The angle calculation unit 23 supplies the inclination angles $\theta_V$ and $\theta_H$ calculated by the inclination angle calculation unit 25 to the trapezoidal correction unit 12.

When the inclination angles $\theta_V$ and $\theta_H$ are supplied to the trapezoidal correction unit 12, the scaler 11 adjusts the resolution of an image signal, and supplies the adjusted image signal to the trapezoidal correction unit 12.

Figure 12A:
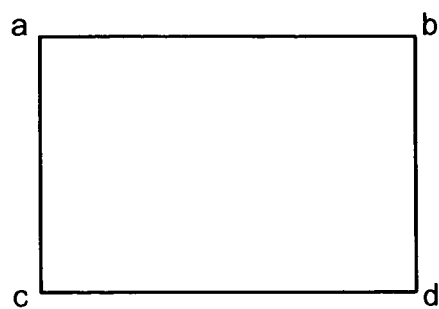
FIGS. 12A to 12C are diagrams showing operations of a trapezoidal correction unit and light modulation unit shown in FIG. 1.

Assume that the image is a quadrangle abcd as shown in FIG. 12A. In this case, the trapezoidal correction unit 12 performs trapezoidal correction on this quadrangle abcd based on the inclination angles $\theta_V$ and $\theta_H$ supplied from the screen angle sensor 16.

The trapezoidal correction unit 12 obtains the correction amount for the projected image by using the supplied inclination angles $\theta_V$ and $\theta_H$ and the translation table for associating the inclination angles $\theta_V$ and $\theta_H$ calculated by using the formula representing the screen plane with the correction amount for a projected image.

However, as described above, the trapezoidal correction unit 12 may perform trapezoidal correction each time the inclination angles $\theta_V$ and $\theta_H$ are supplied, without using the translation table.

The trapezoidal correction unit 12 determines the position and shape of the projected image which will be obtained as a result of correction, based on the obtained correction amount, by using the projected image on the screen 31. Then, the trapezoidal correction unit 12 performs trapezoidal correction by projectively transforming the image signal temporally continuously.

Figure 12B:
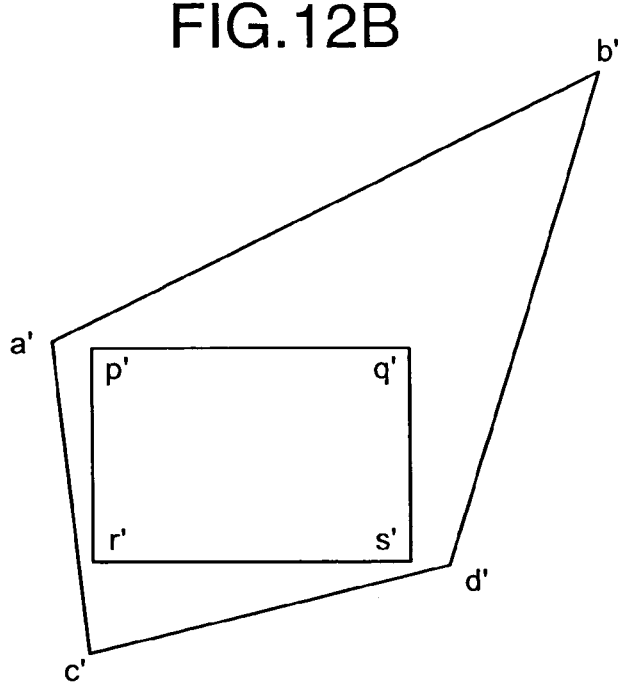
Figure 12C:
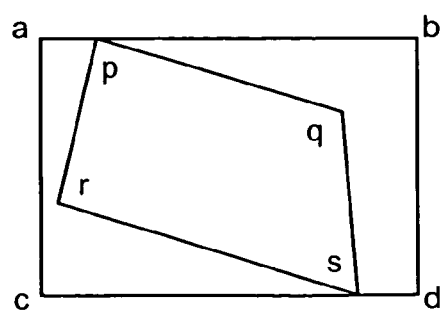

As the result of trapezoidal correction performed by the trapezoidal correction unit 12, the quadrangle abcd shown in FIG. 12A and FIG. 12C is corrected to a quadrangle pqrs shown in FIG. 12C.

The light modulation unit 13 converts the image signal representing the quadrangle pqrs shown in FIG. 12C and obtained after correction by the trapezoidal correction unit 12, into a projection light. The projection light obtained by the conversion by the light modulation unit 13 is projected on the screen 31 which is inclined by the inclination angles $\theta_V$ and $\theta_H$. As a result, the projection image after trapezoidal correction, i.e., a quadrangle p'q'r's' which is shown in FIG. 12B is projected on the screen 31. A quadrangle a'b'c'd' before correction which is shown in FIG. 12B is a projection image in a case where the trapezoidal correction unit 12 does not perform trapezoidal correction.

If the projector 1 has a zooming mechanism, the optical mechanism 15 performs zooming control and supplies information regarding zooming magnification to the trapezoidal correction unit 12. In this case, the trapezoidal correction unit 12 performs trapezoidal correction based on the inclination angles $\theta_V$ and $\theta_H$ and the zooming magnification.

When the projector 1 projects the quadrangle pqrs shown in FIG. 12C on the screen 31 via the projection lens 14, the quadrangle p'q'r's' shown in FIG. 12B is displayed on the screen 31.

As explained above, according to the first embodiment, the distances between the projector 1 and a plurality of measurement points on the screen 31 are measured with the use of the distance sensor 21. A formula representing the screen plane is then derived based on the data representing the measured distances and thereby the inclination angles $\theta_V$ and $\theta_H$ are obtained.

Accordingly, the inclination angles $\theta_V$ and $\theta_H$ can be obtained without the use of an acceleration sensor. That is, it is possible to perform trapezoidal correction without calculating the inclination angle of the screen 31 with respect to the ground planar surface. Further, in both of the cases where the screen 31 is inclined in the horizontal direction with respect to the light axis and where the screen 31 is inclined in the horizontal direction and in the vertical direction, it is possible to perform trapezoidal correction accurately.

(Second Embodiment)

A projector according to the second embodiment includes two distance sensors for measuring the distances between the projector and a plurality of measurement points arranged in a horizontal direction on the screen and the distances between the projector and a plurality of measurement points arranged in a vertical direction on the screen respectively, and obtains inclination angles with the use of these sensors.

The configuration of the projector 1 according to the second embodiment is shown in FIG. 1.

Figure 13:
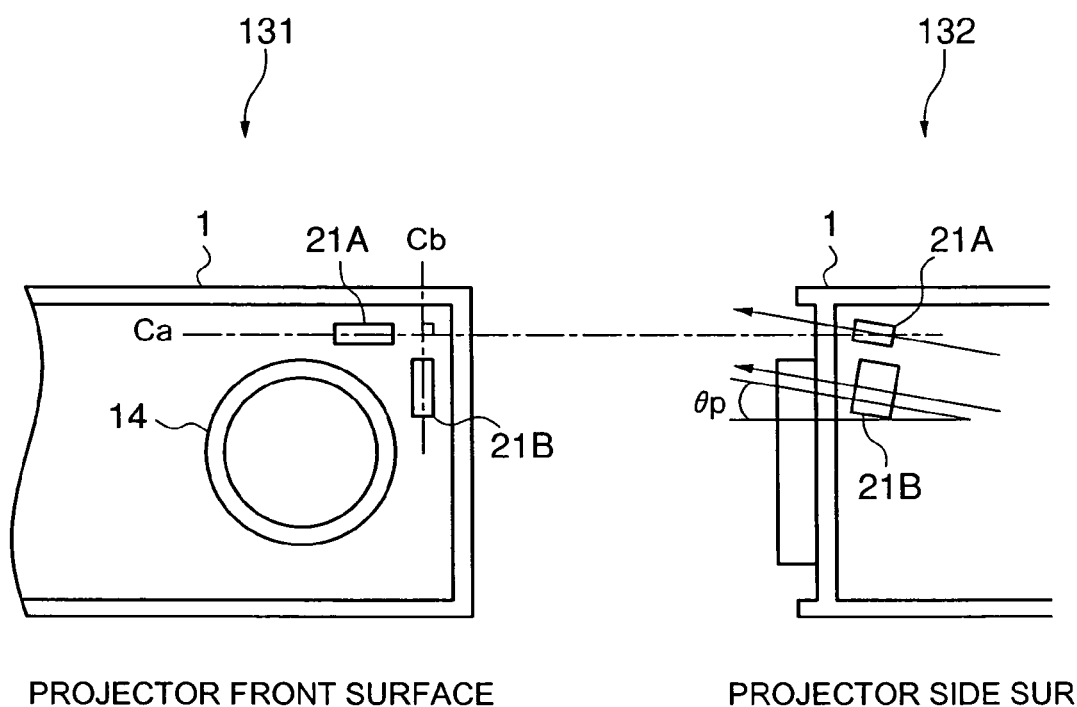
FIG. 13 illustrates diagrams showing arrangement of distance sensors included in a projector according to a second embodiment of the present invention, and specifically showing the front surface of the projector (left diagram), and the side surface of the projector (right diagram)

The projector 1 according to the second embodiment comprises as distance sensors, a distance sensor 21A and a distance sensor 21B which are indicated by 131 and 132 of FIG. 13.

The distance sensors 21A and 21B are both phase difference sensors having a multi-measuring function capable of measuring distances in a plurality of directions, and are constituted by, for example, AF modules.

The distance sensors 21A and 21B are arranged in the vicinity of the projection lens 14 such that their respective centerlines Ca and Cb cross orthogonally, as indicated by 131 of FIG. 13. The distance sensors 21A and 21B measure the distances between the projector 1 and a plurality of measurement points arranged on measurement lines on the screen corresponding to the centerlines Ca and Cb respectively.

As indicated by 132 of FIG. 13, the elevation angle of the distance sensors 21A and 21B with respect to the light axis of a projection light of the projector 1 is assumed to be $\theta_P$. Note that the elevation angle $\theta_P$ may take not only a positive value but also a negative value, or may take zero.

Figure 14:
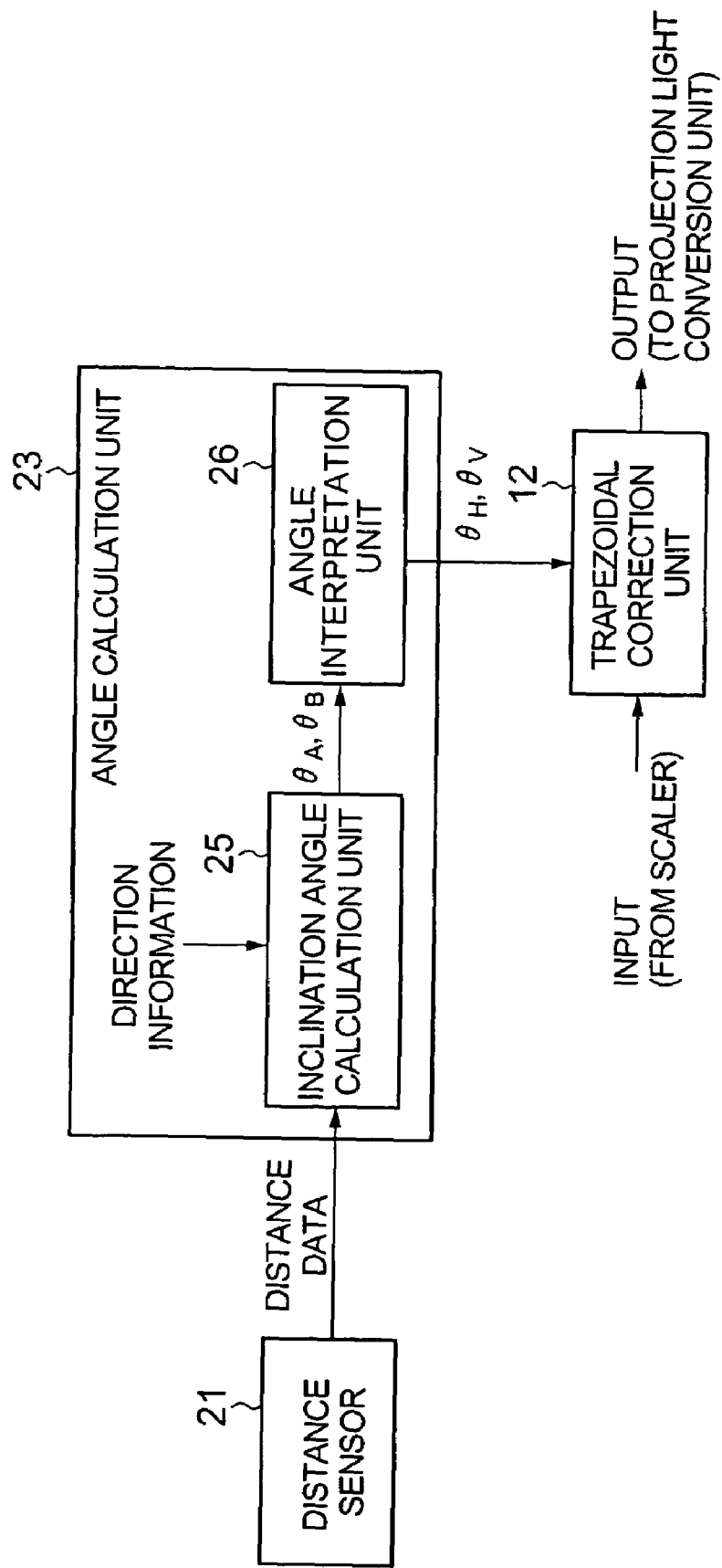
FIG. 14 is a block diagram showing a configuration of an angle calculation unit constituting the projector according to the second embodiment.

The angle calculation unit 23 according to the second embodiment comprises an inclination angle calculation unit 25 and an angle interpretation unit 26 as shown in FIG. 14.

The inclination angle calculation unit 25 according to the second embodiment calculates inclination angles $\theta_A$ and $\theta_B$, based on distance data representing results of measurement performed by the distance sensors 21A and 21B. The inclination angles $\theta_A$ and $\theta_B$ are the angles of inclination of the screen 31 with respect to the centerlines Ca and Cb respectively.

If the distances between the projector 1 and a plurality of measurement points arranged on measurement lines corresponding to the centerlines Ca and Cb can be measured, inclination angles of the screen 31 in the horizontal direction and in the vertical direction can be obtained.

Figure 15:
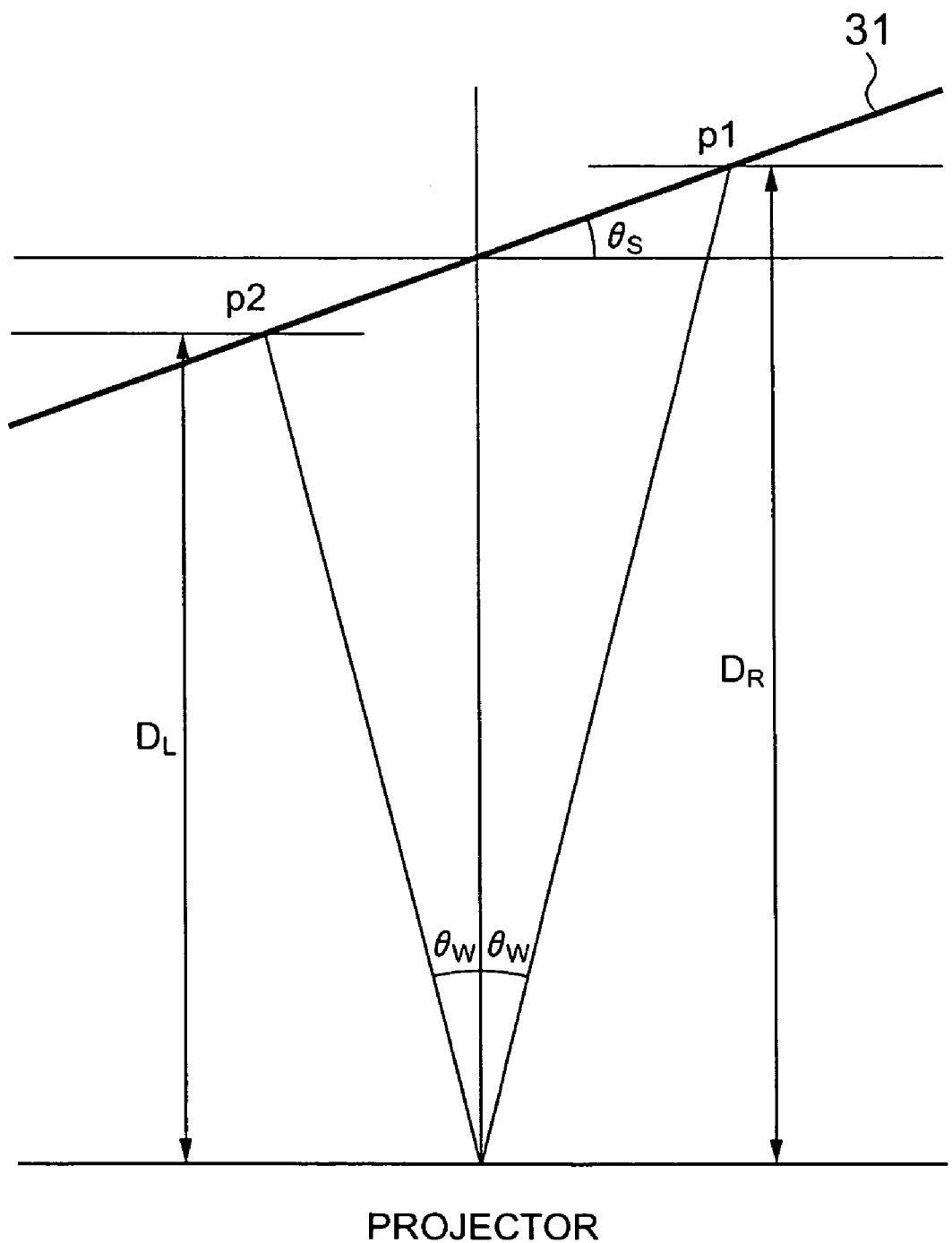
FIG. 15 is a diagram for explaining a calculation method performed by the angle calculation unit shown in FIG. 14 for calculating an angle based on two pieces of distance data representing distances measured by one distance sensor.

The principle of obtaining the inclination angles will now be explained with reference to FIG. 15.

An inclination angle $\theta_S$ of the screen 31 with respect to the light axis of a projection light emitted from the projector 1 is represented by the following formula 26.

$$\theta_S = \arctan\left(\frac{D_R - D_L}{D_R + D_L} \cdot \cos\theta_W\right) \qquad \text{[Formula 26]}$$

($D_R$: distance between the projector 1 and a measurement point p1 on a measurement line, $D_L$: distance between the projector 1 and a measurement point p2 on the measurement line, $\theta_W$: angle formed between the light axis of a projection light from the projector 1 and a line connecting the measurement point p1 and the projector 1, and angle formed between the light axis and a line connecting the measurement point p2 and the projector 1)

The inclination angle $\theta_S$ obtained from a measurement result of the distance sensor 21A is assumed to be $\theta_A$, and the inclination angle $\theta_S$ obtained from a measurement result of the distance sensor 21B is assumed to be $\theta_B$. Since the distance sensors 21A and 21B are arranged such that their centerlines Ca and Cb cross orthogonally, the measurement lines of the distance sensors 21A and 21B also cross orthogonally. Accordingly, inclination angles $\theta_V$ and $\theta_H$ can be calculated according to the following formulae 27 based on the inclination angles $\theta_A$ and $\theta_B$.

$$\theta_H = arc\tan(\tan\theta_A \cdot \cos\theta_B)$$

$$\theta_V = \theta_B - \theta_P \qquad \text{[Formulae 27]}$$

The inclination angle calculation unit 25 calculates the angles $\theta_A$ and $\theta_B$ according to the formula 26, and the angle interpretation unit 26 calculates the inclination angles $\theta_V$ and $\theta_H$ according to the formula 27.

The angle interpretation unit 26 interprets the inclination angles $\theta_A$ and $\theta_B$ calculated by the inclination angle calculation unit 25 into the inclination angles $\theta_H$ and $\theta_V$ respectively, according to the formulae 27. Thus, the angle interpretation unit 26 obtains the inclination angles $\theta_V$ and $\theta_H$.

The angle calculation unit 23 supplies the inclination angles $\theta_V$ and $\theta_H$ calculated by the angle interpretation unit 26 to the trapezoidal correction unit 12.

Next, an operation of the projector 1 according to the second embodiment will be explained.

The control unit 22 controls the distance sensor 21A to measure the distances between the projector 1 and a plurality of measurement points arranged in the horizontal direction.

Further, the control unit 22 controls the distance sensor 21B to measure the distances between the projector 1 and a plurality of measurement points arranged in the vertical direction.

The distance sensors 21A and 21B supply distance data representing the measured distance between the projector 1 and each measurement point to the angle calculation unit 23.

The inclination angle calculation unit 25 of the angle calculation unit 23 calculates the inclination angles $\theta_A$ and $\theta_B$ by using the formula 26, based on the distance data supplied from the distance sensors 21A and 21B.

The angle interpretation unit 26 interprets the inclination angles $\theta_A$ and $\theta_B$ into the inclination angles $\theta_V$ and $\theta_H$, according to the formulae 27.

The angle calculation unit 23 supplies the inclination angles $\theta_V$ and $\theta_H$ calculated by the angle interpretation unit 26 to the trapezoidal correction unit 12.

The trapezoidal correction unit 12 corrects the distortion of the projected image, based on the inclination angles $\theta_V$ and $\theta_H$ supplied from the angle calculation unit 23.

As explained above, according to the second embodiment, the two distance sensors 21A and 21B measure the distances between the projector 1 and a plurality of measurement points arranged on measurement lines crossing orthogonally on the screen 31. The angle calculation unit 23 calculates the inclination angles $\theta_V$ and $\theta_H$, based on plural pieces of distance data.

Therefore, with provision of the two distance sensors 21A and 21B each capable of measuring distances in multiple directions, it is possible to calculate the inclination angles $\theta_V$ and $\theta_H$ in the horizontal direction and in the vertical direction, and to miniaturize the projector by reducing the number of sensors. Furthermore, it is possible to manufacture the projector 1 at low costs. Further, since with the use of the distance sensors 21A and 21B, a pattern for measuring distance can be projected via the projection lens 14, it is possible to improve the measuring precision.

To realize the present invention, various embodiments can be considered other than the above-described first and second embodiments.

For example, in the above-described first and second embodiments, the projector 1 may comprise not only the distance sensors 21, 21A, and 21B, but also an acceleration sensor. The projector 1 may be configured to perform trapezoidal correction with the use of the acceleration sensor based on an inclination angle $\theta_V$ in the vertical direction, in a case where the distance cannot be measured accurately by the distance sensors 21, 21A, and 21B.

Further, in the above-described embodiments, explanation has been made by employing a three-dimensional orthogonal coordinate system having its origin set on the center of the projector 1 or on the plane of the screen 31. However, the inclination angles $\theta_V$ and $\theta_H$ can be obtained wherever the origin is set, as long as the projector 1 and the screen 31 are present in a space which is defined by the three-dimensional orthogonal coordinate system. Further, without the use of a three-dimensional orthogonal coordinate system, but with the use of, for example, a polar coordinate system, the inclination angles $\theta_V$ and $\theta_H$ can likewise be obtained.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2003-275004 filed on Jul. 15, 2003 and including specification, claims, drawings and summary. The disclosure of the above Japanese Patent Application is incorporated herein by reference in its entirety.

What is claimed is:

1. A projector apparatus comprising:
a distance measuring unit which measures distances between itself and a plurality of measurement points on a screen and outputs plural pieces of distance data representing measurement results;
an angle obtaining unit which obtains a screen formula representing a positional relation between a light axis of a projection light projected from the projector apparatus and the screen onto which the projection light is projected, by using the plural pieces of distance data output from the distance measuring unit, and obtains an inclination angle of the light axis with respect to a surface of the screen by using the obtained screen formula;
a correction unit which corrects a distortion of a projection image which is to be displayed on the surface of the screen, by using the inclination angle of the light axis with respect to the surface of the screen obtained by the angle obtaining unit; and
a projection unit which converts the projection image corrected by the correction unit into a projection light and projects the projection image on the surface of the screen.

2. The projector apparatus according to claim 1, further comprising an optical mechanism which controls zooming and supplies information regarding zooming magnification to the correction unit,
wherein the correction unit is configured to correct the distortion of the projection image to be displayed on the surface of the screen, by using the inclination angle of the light axis with respect to the surface of the screen and the information regarding zooming magnification supplied from the optical mechanism.

3. A projector apparatus comprising:
a plurality of distance measuring units, each of which measures distances between itself and a plurality of measurement points positioned on one of a plurality of intersecting measurement lines on a screen, and each of which outputs plural pieces of distance data representing measurement results,
wherein each line connecting one of the measurement points to the projector apparatus is at a substantially identical angle with respect to a light axis of a projection light projected from the projector apparatus;
an angle obtaining unit which obtains inclination angles of the plurality of measurement lines with respect to a plane perpendicular to the light axis, by using the plural pieces of distance data output from the plurality of distance measuring units, and which obtains an inclination angle of the light axis with respect to a surface of the screen by using the plurality of obtained inclination angles;
a correction unit which corrects a distortion of a projection image to be displayed on the surface of the screen by using the inclination angle of the light axis with respect to the surface of the screen obtained by the angle obtaining unit; and
a projection unit which converts the projection image corrected by the correction unit into a projection light and projects the projection image on the surface of the screen.

4. A projector apparatus comprising:
a plurality of distance measuring units, each of which measures distances between itself and a plurality of measurement points positioned on a respective one of a plurality of intersecting measurement lines on a screen, and each of which outputs plural pieces of distance data representing measurement results;
an angle obtaining unit which obtains inclination angles of the plurality of measurement lines with respect to a plane perpendicular to a light axis of a projection light projected from the projector apparatus, by using the plural pieces of distance data output from the plurality of distance measuring units, and which obtains an inclination angle of the light axis with respect to a surface of the screen by using the plurality of obtained inclination angles;
a correction unit which corrects a distortion of a projection image to be displayed on the surface of the screen;
an optical mechanism which controls zooming, and supplies information regarding zooming magnification to the correction unit, wherein the correction unit is configured to correct the distortion of the projection image to be displayed on the surface of the screen, by using the inclination angle of the light axis with respect to the surface of the screen and the information regarding zooming magnification supplied from the optical mechanism; and a projection unit which converts the projection image corrected by the correction unit into a projection light and projects the projection image on the surface of the screen.

5. An inclination angle obtaining method for obtaining an inclination angle of a projector apparatus with respect to a surface of a screen, the method comprising:

a measuring step of measuring distances between the projector apparatus and a plurality of measurement points on the screen;

a screen formula obtaining step of obtaining a screen formula representing a positional relation between a light axis of a projection light projected from the projector apparatus and the surface of the screen onto which the projection light is projected, by using plural pieces of distance data representing measurement results in the measuring step; and an inclination angle obtaining step of obtaining inclination angles of the surface of the screen with respect to the light axis by using the obtained screen formula.

6. The inclination angle obtaining method according to claim 5, wherein:

the screen formula obtaining step includes:

setting, in a space in which the projector apparatus and the screen are present, a three-dimensional orthogonal coordinate system which is constituted by x, y, and z axes orthogonal to one another and in which the screen crosses the z axis perpendicularly;

representing the screen formula by a first formula:

$z = ax + by + c,$ in which a, b, and c are coefficients;

assigning coordinates $(x_i, y_i, z_i)$ of the plurality of measurement points, which are obtained in the measuring step by measuring the distances, to x, y, and z of the first formula, so as to obtain the simultaneous equations:

$$\begin{pmatrix} z_1 \\ z_2 \\ \vdots \\ z_i \\ \vdots \\ z_N \end{pmatrix} = \begin{pmatrix} x_1 & y_1 & 1 \\ x_2 & y_2 & 1 \\ \vdots & \vdots & \\ x_i & y_i & 1 \\ \vdots & \vdots & \\ x_N & y_N & 1 \end{pmatrix} \begin{pmatrix} a \\ b \\ c \end{pmatrix};$$

using the simultaneous equations to obtain values $S_0$ to $S_8$ according to a second formula:

$$s_0 = N \quad s_3 = \sum_{i=1}^{N} z_i \quad s_6 = \sum_{i=1}^{N} x_i z_i$$

$$s_1 = \sum_{i=1}^{N} x_i \quad s_4 = \sum_{i=1}^{N} x_i^2 \quad s_7 = \sum_{i=1}^{N} y_i^2$$

$$s_2 = \sum_{i=1}^{N} y_i \quad s_5 = \sum_{i=1}^{N} x_i y_i \quad s_8 = \sum_{i=1}^{N} y_i z_i;$$

obtaining the coefficients a, b, and c of the first formula in accordance with a third formula:

$$a = \frac{s_1(s_2 \cdot s_8 - s_3 \cdot s_7) + s_5(s_2 \cdot s_3 - s_0 \cdot s_8) + s_6(s_0 \cdot s_7 - s_2^2)}{s_4(s_2^2 - s_0 \cdot s_7) + s_1^2 \cdot s_7 + s_0 \cdot s_5^2 - 2 \cdot s_1 \cdot s_2 \cdot s_5}$$

$$b = \frac{s_4(s_2 \cdot s_3 - s_0 \cdot s_8) + s_1^2 \cdot s_8 + (s_0 \cdot s_5 - s_1 \cdot s_2)s_6 + s_1 \cdot s_3 \cdot s_5}{s_4(s_2^2 - s_0 \cdot s_7) + s_1^2 \cdot s_7 + s_0 \cdot s_5^2 - 2 \cdot s_1 \cdot s_2 \cdot s_5}$$

$$c = \frac{s_4(s_3 \cdot s_7 - s_2 \cdot s_8) + s_1 \cdot s_5 \cdot s_8 + s_6(s_2 \cdot s_5 - s_1 \cdot s_7) - s_3 \cdot s_5^2}{s_4(s_2^2 - s_0 \cdot s_7) + s_1^2 \cdot s_7 + s_0 \cdot s_5^2 - 2 \cdot s_1 \cdot s_2 \cdot s_5};$$

and obtaining the screen formula represented by the first formula by assigning the obtained coefficients a, b and c to the first formula; and the inclination angle obtaining step includes obtaining inclination angles $\theta_H$ and $\theta_V$ by using the screen formula obtained in the screen formula obtaining step and a fourth formula:

$$z = \frac{\tan\theta_H}{\cos\theta_v} \cdot x + \tan\theta_v \cdot y$$

representing coordinates (x, y, z) of a point on the screen in a case where the screen is rotated about the y axis by the inclination angle $\theta_H$ and rotated about the x axis by the inclination angle $\theta_V$.

7. An inclination angle obtaining method for obtaining an inclination angle of a projector apparatus with respect to a surface of a screen, the method comprising:

a measuring step of measuring distances between the projector apparatus and a plurality of measurement points positioned on corresponding ones of a plurality of intersecting measurement lines on the screen, wherein each line connecting one of the measurement points to the projector apparatus is at a substantially identical angle with respect to a light axis of a projection light projected from the projector apparatus;

an angle obtaining step of obtaining an angle formed between an ideal screen surface perpendicular to the light axis of the projector apparatus and each of the plurality of measurement lines; and an angle interpreting step of interpreting each angle obtained in the angle obtaining step into an inclination angle of the light axis of the projector apparatus with respect to the surface of the screen.

8. A projection image correction method for correcting a distortion of a projection image, comprising:

a measuring step of measuring distances between a predetermined reference point and a plurality of measurement points on a screen;

a screen formula obtaining step of obtaining a screen formula representing a positional relation between a light axis of a projection light to be projected on the screen and the screen, by using plural pieces of distance data representing measurement results in the measuring step;

an inclination angle obtaining step of obtaining an inclination angle of the light axis with respect to a surface of the screen by using the obtained screen formula; and a correcting step of correcting a distortion of a projection image to be displayed on the surface of the screen, by using the inclination angle of the light axis with respect to the surface of the screen which is obtained in the inclination angle obtaining step.

9. A projection image correction method for correcting a distortion of a projection image, comprising:
a measuring step of measuring distances between a projector and a plurality of measurement points positioned on corresponding ones of a plurality of intersecting measurement lines on a screen, wherein each line connecting one of the measurement points to the projector apparatus is at a substantially identical angle with respect to a light axis of a projection light projected from the projector apparatus;
an angle obtaining step of obtaining an angle formed between an ideal screen surface perpendicular to the light axis of the projector and each of the plurality of measurement lines;
an angle interpreting step of interpreting each angle obtained in the angle obtaining step into an inclination angle of the light axis of the projector with respect to a surface of the screen; and
a correcting step of correcting a distortion of a projection image to be displayed on the surface of the screen, by using the inclination angles of the light axis of the projector with respect to the surface of the screen, which are obtained by interpretation in the angle interpreting step.

10. An inclination angle obtaining method for obtaining an inclination angle of a projector apparatus with respect to a surface of a screen, the method comprising:
a measuring step of measuring distances between the projector apparatus and a plurality of measurement points positioned on corresponding ones of a plurality of intersecting measurement lines on the screen;
an angle obtaining step of obtaining an angle formed between an ideal screen surface perpendicular to a light axis of the projector apparatus and each of the plurality of measurement lines; and
an angle interpreting step of interpreting each angle obtained in the angle obtaining step into an inclination angle of the light axis of the projector apparatus with respect to the surface of the screen;
wherein the plurality of measurement lines are constituted by two measurement lines extending in a horizontal direction and in a vertical direction, respectively, and two measurement points are located on each of the measurement lines;
wherein the measuring step includes a step of measuring distances between the projector apparatus and the two measurement points on each of the two measurement lines;
wherein the angle obtaining step includes, for each of the two measurement lines, obtaining an angle $\theta_S$ formed between the ideal screen surface perpendicular to the light axis of the projector and the measurement line by using a first formula:

$$\theta_S = \arctan\left(\frac{DR - DL}{DR + DL} \cdot \cos\theta_W\right)$$

where DL and DR represent the distances between the projector apparatus and the two measurement points on the measurement line and $\theta_W$ represents an angle formed between each line connecting the projector apparatus to one of the measurement points and the light axis of the projector apparatus; and
wherein the angle interpreting step includes:
assuming the angle $\theta_S$ obtained by measuring the distances between the projector apparatus and the two measurement points on one of the measurement lines to be $\theta_A$;
assuming the angle $\theta_S$ obtained by measuring the distances between the projector apparatus and the two measurement points on the other measurement line to be $\theta_B$; and
interpreting the angles $\theta_A$ and $\theta_B$ into an inclination angle $\theta_H$ of the light axis of the projector apparatus with respect to the surface of the screen in a horizontal direction and an inclination angle $\theta_V$ of the light axis of the projector apparatus with respect to the surface of the screen in a vertical direction, respectively, by using a second formula:

$\theta_H = \arctan(\tan\theta_A \cdot \cos\theta_B)$ $\theta_V = \theta_B$.

* * * * *